(12) United States Patent
Wu

(10) Patent No.: US 8,140,847 B1
(45) Date of Patent: Mar. 20, 2012

(54) DIGITAL SAFE

(76) Inventor: Jianqing Wu, Beltsville, MD (US)

( * ) Notice: Subject to any disclaimer, the term of this patent is extended or adjusted under 35 U.S.C. 154(b) by 608 days.

(21) Appl. No.: 12/233,575

(22) Filed: Sep. 18, 2008

Related U.S. Application Data

(60) Provisional application No. 60/973,445, filed on Sep. 18, 2007.

(51) Int. Cl.
*H04L 9/32* (2006.01)
*G06F 7/04* (2006.01)
(52) U.S. Cl. .......................................... 713/175; 726/27
(58) Field of Classification Search .................... 713/175
See application file for complete search history.

(56) References Cited

U.S. PATENT DOCUMENTS

| | | | |
|---|---|---|---|
| 2002/0046188 A1* | 4/2002 | Burges et al. ................... | 705/67 |
| 2002/0111946 A1* | 8/2002 | Fallon ............................... | 707/9 |
| 2005/0203885 A1* | 9/2005 | Chenevich et al. ............... | 707/3 |
| 2007/0220614 A1* | 9/2007 | Ellis et al. ........................ | 726/27 |
| 2007/0276754 A1* | 11/2007 | Parmelee et al. ................ | 705/43 |

* cited by examiner

*Primary Examiner* — Matthew Smithers
(74) *Attorney, Agent, or Firm* — Jianqing Wu

(57) ABSTRACT

An online file lodging system or digital safe, which comprises plural safes or safe user accounts, is disclosed for securely storing highly confidential files. A user of the system can create an individual safe by using account management tool. The system has a web-based use interface, from which the user can upload files for storage with detailed tracking information, grant the right of access to the owner of another safe, and generate authenticity certificate for proving the uploading time and the substance of the file in a future time.

20 Claims, 42 Drawing Sheets

Login Your Safe

Safe Name (Login Name):

Password:

[Login]   [Clear Form]

Forget Password?

If you do not have a safe,
you can create a free safe, click sign up.

*FIG. 2*

Back to

Forget your password?

Type your Safe Name (Login Name) and click on the continue button, you will see your security question.

Safe Name (Login Name):

[continue]   [Clear Form]

*FIG. 3A*

Back To Previous

Forget your password?

Type the answer right to your security question, and click on the recover button, your password will be sent to your email address!

Your Security Question is: Where did you attend your first college?

*FIG. 3B*

Your Security Answer is: [          ]

[ Recover ]     [ Clear Form ]

Register A Safe

| Field | Input |
|---|---|
| Safe Name (Login Name): | |
| *Password: | |
| *Re-type Password: | |
| *Email: | |
| *Access Code: | |
| First Name: | |
| Last Name: | |
| Title: | select a title ▼ |
| Address: | |
| City: | |
| State: | Select a state ▼ |
| Zip: | |
| Phone: | |
| Security Question: | Where was you born? ▼ |
| Security Answer: | |

*FIG. 4A*

[ Register ]     [ Clear Form ]

FIG. 4B

Update Address For Safe: person1

*Email: person1@person.com
*Access Code: person1       (6-10 letters)
First Name: White
Last Name: Smith
Title: Mr.
Address: No.114, street 7, pleasant road
City: scranton
State: Pennsylvania
Zip: 12345
Phone: 1234567890
Security Question: Where did you attend your first college?
Security Answer: Pennsylvania

[Update]   [Clear Form]

*FIG. 4C*

Warning: At least one person other than yourself knows your safe password, you must change your safe password before you are allowed to use your safe.

Change Password For Safe: person3

*FIG. 4D*

Old Password:
New Password:
Re-type Password:

[Change]   [Clear Form]

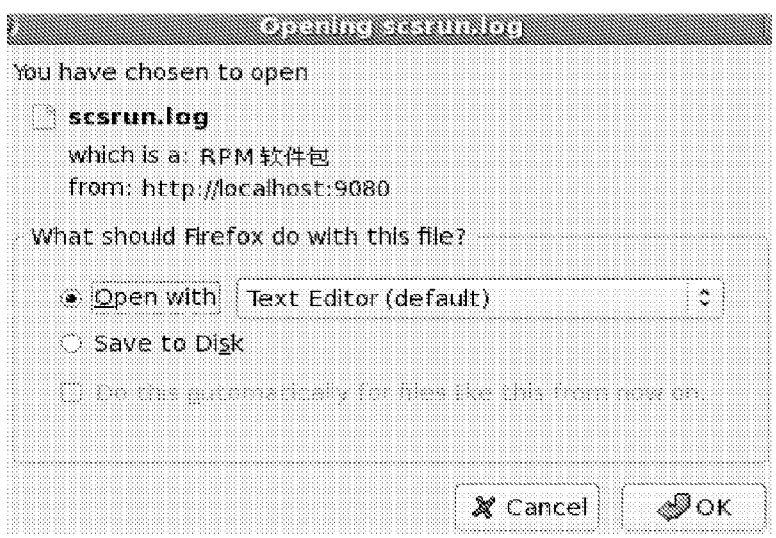

Your file was uploaded successfully!

Message: Now please save the file and verify it.

| | |
|---|---|
| File No: | 0000-0000-0000-0005 |
| Description: | text file |
| Size (K): | 12.8 |
| Uploading Date/Time: | 09/16/2008 18:42:07 |
| Security Method: | Single Key |
| Safe: | person1 |
| Safe Owner Name: | White Smith |

Can you open and read the file?

Yes | No

*FIG. 5D*

| | File Summaries  Account  Access Management  Certificate  Upload File  Logout |
|---|---|
| | Download File\|Send Message\|Receive Message\|Global Search\|Decrypt File\|Help |

Safe name: | Safe owner: | Safe No. | Access code
personal | Willie Smith | 000-0000-000005 | 10005

File Summaries

Your Safe    Other Users' Safe    Your Unsecured Drawer

---

Files In Your Own Safe

| File No. | Description | Uploading Date/Time | Size (K) | Security | Status | Verified | Download |
|---|---|---|---|---|---|---|---|
| 0000-0000-0000-0027 | Two-key file | 09/15/2008 18:54:01 | 99.5 | Two Keys | Active | V | Decrypt |
| 0000-0000-0000-0025 | Test file | 09/13/2008 22:36:24 | 0.3 | Single Key | Active | V | Decrypt |
| 0000-0000-0000-0024 | Test file | 09/13/2008 21:33:38 | 52.3 | Encrypted File | Active | | Download |
| 0000-0000-0000-0023 | Number file2 | 09/13/2008 21:31:23 | 0.2 | Safe Password | Active | | Download |
| 0000-0000-0000-0022 | Testfile1 | 09/13/2008 21:29:15 | 0.2 | Not Encrypted | Active | | Download |

Total Records: 12 | Page: [1 ▼] of 3 | Records per page: [5 ▼] | First Back Next Last

FIG. 6A

File Summaries

Your Safe   Other Users' Safe   Your Unsecured Drawer
------------------------------------------------------------
Files You Have Right To Access

| File No. | Owner | Description | Size (K) | Security | Uploading Date/Time | Access Type |
|---|---|---|---|---|---|---|
| 0000-0000-0000-0012 | person2 | | 412 | Single Key | 09/13/2008 15:00:12 | Download |

Total Records: 1 | Page: 1 ▼ of 1 | Records per page: 5 ▼ | First Back Next Last

*FIG. 6B*

File Summaries

Your Safe   Other Users' Safe   Your Unsecured Drawer
------------------------------------------------------------
Files In Your Unsecured Drawer

| File No. | Description | Uploading Date/Time | Security | Size (K) | Download |
|---|---|---|---|---|---|
| 0000-0000-0000-0001 | testfile | 09/13/2008 21:34:39 | Unsecured | 02 | Download |

Total Records: 1 | Page: 1 ▼ of 1 | Records per page: 5 ▼ | First Back Next Last

*FIG. 6C*

Download File

| | |
|---|---|
| File No: | 0000-0000-0000-0001 |
| File Owner: | person1 |
| Description: | testfile |
| Size (K): | 02 |
| Security method: | Unsecured |
| Total access number: | |
| The access number you have used: | |
| The access number remaining: | |
| Your access right will expire: | |

(regardless of the number of remaining access.)

Submit    Close

*FIG. 6D*

Descrypt & Download File

Message: File is downloaded successfully.

| | |
|---|---|
| File No: | 0000-0000-0000-0012 |
| File Owner: | person2 |
| Description: | test |
| Size (K): | 0.2 |
| Security method: | Single Key |
| Total access number: | |
| The access number you have used: | |
| The access number remaining: | |
| Your access right will expire: | |

(regardless of the number of remaining access.)

WARNINGS: If you do not provide keys, you will not be able to descript, open and read this file.

◉ Descrypt & Download

| Your hint for key: | ns |
|---|---|
| key: | ••••••  (6-20 letters) |

○ Dowload

[ Submit ]  [ Close ]

*FIG. 6E*

File Details For:
0000-0000-0000-0009
Description:
test file5

- Change Status
- Delete File
- Change Access Right
- Order Certificate

- View Access Histories

File Details

Back To File S

| | |
|---|---|
| File No: | 0000-0000-0000-0009 |
| Size (K): | 02 |
| Status: | Global |
| Security: | Single Key |
| Description: | test file5 |
| Uploading Date/Time: | 09/16/2008 21:38:39 |

Third Party Having Right To Read

| Access Code | Safe Name |
|---|---|
| (No entry) | |

*FIG. 7A*

Change Status

File No: 0000-0000-0000-0009

Status: Active

- ● Active
- ○ Inactive
- ○ Global

Notes:
    Active--active file can be authorized
    Inactive--inactive file can not be authorized
    Global--anyone can get the file without login and being granted access right Change

*FIG. 7B*

Delete File

Back To File Sum

| | |
|---|---|
| File No: | 0000-0000-0000-0009 |
| Description: | test file5 |

Warning: This file will be permanently deleted and will not be available for downloading!

The Reason For Deletion

- ○ The matter is closed and so the file is no longer useful.
- ⦿ The file is updated.
- ○ No reason.
- ○ Other: _____

[Submit To Delete]

*FIG. 7C*

Change Access Right(1)

You are changing Access Right for the following file

| | |
|---|---|
| File No: | 0000-0000-0000-0009 |
| Size (K): | 02 |
| Status: | Global |
| Security: | Single Key |
| Description: | test file5 |
| Uploading Date/Time: | 09/16/2008 213839 |

Step1. Select Action Type:

⦿ Grant    ○ Revoke

[Continue] [Clear Form]

*FIG. 7D*

Back To File Sum

Change Access Right(2)

You are changing Access Right for the following file

| | |
|---|---|
| File No: | 0000-0000-0000-0009 |
| Size (K): | 02 |
| Status: | Active |
| Security: | Single Key |
| Description: | test file5 |
| Uploading Date/Time: | 09/16/2008 213839 |

Step2. Enter Recipient Safe Name And Access Code:

(If the guest don't have a safe, click "CREATE".)
(If you don't know Access Code, click "FIND".)

| | |
|---|---|
| Safe Name (Login Name)(CREATE): | person2 |
| Access Code(FIND): | 100006 |

● More Recipient Safe  ● Fewer Recipient Safe

Step3. Select Access Type, Access Number & Access Period:

*FIG. 7E*

Change Access Right(3)

Message: Access right is granted successfully.

You are changing Access Right for the following file

| | |
|---|---|
| File No: | 0000-0000-0000-0009 |
| Size (K): | 02 |
| Status: | Global |
| Security: | Single Key |
| Description: | test file5 |
| Uploading Date/Time: | 09/16/2008 21:38:39 |

Do you want to change access right to another safe?

○ Yes  ○ No

*FIG. 7F*

Back To File Summ

Change Access Right(3)

Message: Access right is revoked successfully.

You are changing Access Right for the following file

| | |
|---|---|
| File No: | 0000-0000-0000-0009 |
| Size (K): | 02 |
| Status: | Global |
| Security: | Single Key |
| Description: | test file5 |
| Uploading Date/Time: | 09/16/2008 21:38:39 |

Do you want to change access right to another safe?

○ Yes  ○ No

*FIG. 7G*

Oreder Certificate

| Ordered Electronic Certificates | Ordered Hard-Copy Certificates |

---

Order New Certificate  Help

Step1. Select The File For Issuring Authenticity Certificate:

| File No. | Description | View E-Certificate |
|---|---|---|
| 0000-0000-0000-0005 | text file | View |

Step2. Select Type Of Certificate:

- ● Order Electronic Certificate
- ○ Order Hard-Copy Certificate

Continue | Clear Form

*FIG. 7H*

Order Electronic Certificate

You have selected the following files for certificates

| File No. | Uploading Date/Time | Size (K) | Descripation | Status |
|---|---|---|---|---|
| 0000-0000-0000-0005 | 09/16/2008 18:42:07 | 12.8 | text file | Active |

Step3. Enter Recipient Safe Name And Access Code:

(If the guest don't have a safe, click "CREATE")
(If you don't know Access Code, click "FIND")

Safe Name (Login Name)(CREATE): person2
Access Code(FIND): 100006

● More Recipient Safe  ● Fewer Recipient Safe

Submit | Back | Clear Form

*FIG. 7I*

Order Electronic Certificate

Message: Electronic certiftcate is ordered successfully.

If you went to get the PDF version certificate, click here.

You have selected the following files for certificates

| File No. | Uploading Date/Time | Size (K) | Descripation | Status |
|---|---|---|---|---|
| 0000-0000-0000-0005 | 09/16/2008 18:42:07 | 128 | text file | Active |

Do you went to order another certificate?

Yes | No

*FIG. 7J*

Order Hard-Copy Certificate

You have selected the following files for certificates

| File No. | Uploading Date/Time | Size (K) | Description | Stat |
|---|---|---|---|---|
| 0000-0000-0000-0005 | 09/16/2008 18:42:07 | 12.8 | text file | Activ |

Step3. Send Certificate And Files To The Following Safe:
 (optional)

(if you don't know Access Code, click "FIND".)

Safe Name (Login Name): person2

Access Code(FIND): 100006

Step4. Provide Recipient Mailing Address:

● Show address of the safe name you typed

Prefix: select a prefix ▼   *First Name: Testman

MI:   *Last Name: LastName

Title:   Company:

*Address: 1128 8th st

*City: Bay   *State: Kentucky ▼

*Zip Code: 95089   Country:

Daytime Phone: ( ) -

*Evening Phone: (111 ) 111 - 1111

*Email: test6@test.com

Step5. Indicate If The Files Is Included:

☑ Include file to be certified

Continue | Back | Clear Form

*FIG. 7K*

Order Hard-Copy Certificate

Step5. Select A Method For Sending Files:

| File No. | Security | Descrypt Keys | Include encrypted files by CD | Include descrypted files by CD | Include descrypted files in hard copy |
|---|---|---|---|---|---|
| 0000-0000-0000-0005 | Single Key | | ○ | ○ | ○ |

Submit    Back

*FIG. 7L*

Order Hard-Copy Certificate

Message: Hard-copy certificate is ordered successfully.

If you went to get the PDF version certificate, click here.

You have selected the following files for certificates

| File No. | Uploading Date/Time | Size (K) | Descripation | Status |
|---|---|---|---|---|
| 0000-0000-0000-0005 | 09/16/2008 18:42:07 | 12.8 | test file | Active |

What do you went to do next step?

| | |
|---|---|
| Order a certificate for another safe by the files above | Go |
| Order another certificate | Go |
| Go to file summary | Go |

*FIG. 7M*

Access Management

View Granted Access    Grant New Access    Revoke Access

---

Grant Access (Step1)

Step1. Select Files For Granting Access Right:

You have the following files in your safe

| ☐ | File No. | Size (K) | Description | Security |
|---|---|---|---|---|
| ☑ | 0000-0000-0000-0010 | 0.2 | Test | Not Encrypted |
| ☑ | 0000-0000-0000-0008 | 12.8 | text file | Single Key |
| ☐ | 0000-0000-0000-0007 | 0.2 | Test2 | Single Key |
| ☐ | 0000-0000-0000-0006 | 0.2 | test10 | Single Key |
| ☐ | 0000-0000-0000-0005 | 12.8 | text file | Single Key |

Total Records: 8 | Page: 1 ▾ of 2 | Records per page: 5 ▾ | First Back Next Last Continue | Clear Form

*FIG. 9A*

Access Management

View Granted Access   Grant New Access   Revoke Access

---

Grant Access (Step2)

You are granting access right for the following files

| File No. | Size (K) | Description | Security |
|---|---|---|---|
| 0000-0000-0000-0010 | 0.2 | Test | Not Encrypted |
| 0000-0000-0000-0006 | 128 | text file | Single Key |

Step2. Enter Recipient Safe Name And Access Code:

(If the guest don't have a safe, click "CREATE".)
(If you don't know Access Code, click "FIND".)

Safe Name (Login Name)(CREATE): person2
Access Code(FIND): 100006

◆ More Recipient Safe   ◆ Fewer Recipient Safe

Step3. Select Access Type, Access Number & Access Period:

| Type Of Access | Access Number Limit | Access Period Limit |
|---|---|---|
| ○ View Summary<br>○ View Summary & Download<br>⦿ View Summary, Download & Decrypt File | ○ 3 times<br>⦿ 10 times<br>○ [   ] times<br>○ No Limit | ○ 3 days<br>⦿ 10 days<br>○ [   ] day ▼<br>○ No Limit |

Submit | Back

*FIG. 9B*

Access Management

Message: Access right is revoked successfully.

If you went to send a message, please click here.

View Granted Access    Grant New Access    Revoke Access

---

Grant Access (Step3)

You are granting access right for the following files

| File No. | Size (K) | Description | Security |
|---|---|---|---|
| 0000-0000-0000-0010 | 0.2 | Test | Not Encrypted |
| 0000-0000-0000-0008 | 128 | text file | Single Key |

Do you went to grant another access right?

Yes | No

Access Management

View Granted Access    Grant New Access    Revoke Access

---

Revoke Access

File No: [        ]    Recipient Safe: [        ]    Search

| | Recipient's Safe | Recipient's Full Name | File No. | Granted Date/Time | Access Type | Access Number | Expiration Date | |
|---|---|---|---|---|---|---|---|---|
| ☐ | person2 | One Jadam | 0000-0000-0000-0007 | 09/18/2008 14:53:43 | Download | No Limit | 09/28/2008 | Revoke |
| ☐ | person2 | One Jadam | 0000-0000-0000-0008 | 09/18/2008 14:58:01 | Decrypt | 10 | 09/28/2008 | Revoke |
| ☐ | person2 | One Jadam | 0000-0000-0000-0010 | 09/18/2008 14:58:00 | Decrypt | 10 | 09/28/2008 | Revoke |

Total Records: 3 | Page: [1 ▼] of 1 | Records per page: [5 ▼] | First Back Next Last Revoke All    back

*FIG. 9D*

Access Management

View Granted Access  Grant New Access  Revoke Access

---

Revoke Access

Message: Access right is revoked successfully.

| | Recipient's Safe | Recipient's Full Name | File No. | Granted Date/Time | Access Type | Access Number | Expiration Date | |
|---|---|---|---|---|---|---|---|---|
| ☐ | person2 | One Jodom | 0000-0000-0000-0010 | 08/18/2008 14:58:00 | Decrypt | 10 | 08/28/2008 | Revoke |

File No: ____  Recipient Safe: ____  Search

Total Records: 1 | Page: 1 ▼ of 1 | Records per page: 5 ▼ | First Back Next Last Revoke All    back

*FIG. 9E*

Certificate Management

View Ordered e-Certificates | View Ordered Paper Certificates | View Certificates from Other Safes

Order New Certificate  [Help]

Step 1. Select Files For Issuing Authenticity Certificate:

| File No. | Description | View E-Certificate | |
|---|---|---|---|
| 0000-0000-0000-0010 | Test | View | ☐ |
| 0000-0000-0000-0008 | text file | View | ☐ |
| 0000-0000-0000-0007 | Test2 | View | ☐ |
| 0000-0000-0000-0006 | test10 | View | ☐ |
| 0000-0000-0000-0005 | text file | View | ☐ |

Total Records: 8 | Page: [1 ▼] of 2 | Records per page: [5 ▼] | First Back Next Last Step 2. Select Type Of Certificate:
- ⦿ Order Electronic Certificate
- ○ Order Hard-Copy Certificate Continue | Clear Form

*FIG. 10A*

Order Electronic Certificate

You have selected the following files for certificates

| File No. | Uploading Date/Time | Size (K) | Descripation | Status |
|---|---|---|---|---|
| 0000-0000-0000-0010 | 09/17/2008 11:08:39 | 0.2 | Test | Active |
| 0000-0000-0000-0008 | 09/16/2008 21:34:22 | 12.8 | text file | Active |

Step3. Enter Recipient Safe Name And Access Code:

(If the guest don't have a safe, click "CREATE".)
(If you don't know Access Code, click "FIND".)

Safe Name (Login Name)(CREATE): person2

Access Code(FIND): 100006

● More Recipient Safe  ● Fewer Recipient Safe

Submit | Back | Clear Form

*FIG. 10B*

Order Electronic Certificate

Message: Electronic certiftcate is ordered successfully.

If you went to get the PDF version certificate, click here.

You have selected the following files for certificates

| File No. | Uploading Date/Time | Size (K) | Descripation | Statu |
|---|---|---|---|---|
| 0000-0000-0000-0010 | 09/17/2008 11:08:39 | 0.2 | Test | Active |
| 0000-0000-0000-0008 | 09/16/2008 21:34:22 | 12.8 | text file | Active |

Do you went to order another certificate?

Yes | No

*FIG. 10C*

| File No. | Uploading Date/Time | Size (K) | Description | Status |
|---|---|---|---|---|
| 0000-0000-0000-0010 | 09/17/2008 11:09:39 | 0.2 | Test | Active |
| 0000-0000-0000-0008 | 09/16/2008 21:34:22 | 12.8 | test file | Active |

You have selected the following files for certificates

Step3. Send Certificate And Files To The Following Safe: (optional)

(If you don't know Access Code, click "FIND".)

Safe Name (Login Name): person2
Access Code(FIND): 100006

Step4. Provide Recipient Mailing Address:

• Show address of the safe name you typed

Prefix: select a prefix
MI:
Title:
*Address: 1128 8th st
*City: Bay
*Zip Code: 95089
Daytime Phone: (510) 666 - 8989
*Evening Phone: (510) 666 - 7788
*Email: test2@test.com

*First Name: john
*Last Name: Green
Company:
*State: California
Country: USA

Step5. Indicate If The Files Is Included:

☑ Include file to be certified

Continue | Back | Clear Form

*FIG. 10D*

Order Hard-Copy Certificate

Step6. Select A Method For Sending Files:

| File No. | Security | Descrypt Keys | Include encrypted files by CD | Include descrypted files by CD | Include descrypted files in hard copy |
|---|---|---|---|---|---|
| 0000-0000-0000-0010 | Not Encrypted | | ● | ○ | ○ |
| 0000-0000-0000-0008 | Single Key | | ● | ○ | ○ |

Submit    Back

*FIG. 10E*

Order Hard-Copy Certificate

Message: Hard-copy certificate is ordered successfully.

If you went to get the PDF version certificate, click here.

You have selected the following files for certificates

| File No. | Uploading Date/Time | Size (K) | Description | Status |
|---|---|---|---|---|
| 0000-0000-0000-0010 | 09/17/2008 11:09:39 | 0.2 | Test | Active |
| 0000-0000-0000-0008 | 09/16/2008 21:34:22 | 12.8 | text file | Active |

What do you went to do next step?

| | |
|---|---|
| Order a certificate for another safe by the files above | Go |
| Order another certificate | Go |
| Go to file summary | Go |

*FIG. 10F*

Descrypt File

Select A Descrypting Method
- Use single key descryption
  key: [......] (6-20 letters)
- Use two key descryption Select A File
/root/Desktop/craigslist-sample.odt
(The Maximum Size Is 40M!)

Descrypt | Clear Form

*FIG. 11*

Global Search

File No: 18    Search

| File No. | Owner | Description | Size (K) | Security | Uploading Date/Time | download |
|---|---|---|---|---|---|---|
| 000-0000-0000-0013 | person1 | text2 | 412 | Single Key | 08/13/2008 20:08:17 | Descrypt |
| 000-0000-0000-0011 | person2 | Good luck | 148 | Single Key | 08/13/2008 15:02:34 | Descrypt |
| 000-0000-0000-0010 | person2 | | 14 | Single Key | 08/13/2008 14:58:58 | Descrypt |
| 000-0000-0000-0009 | person2 | | 412 | Single Key | 08/13/2008 14:58:23 | Descrypt |
| 000-0000-0000-0006 | person2 | Testfile1 | 148 | Single Key | 08/13/2008 14:55:01 | Descrypt |

Total Records: 5 | Page: 1 of 1 Records per page: 5 | First Back Next Last

*FIG. 12*

DIGITAL SAFE

CROSS-REFERENCE TO RELATED APPLICATION

This patent application claims the priority from the U.S. Provisional Patent Application No. 60/973,445 accorded with a filing date of Sep. 18, 2007.

BACKGROUND OF THE INVENTION

Safe boxes are used for storing money, legal instructions, important intangible things, and important documents. Most banks lease conventional safe boxes ("CSB") to their customers for the storage of valuable items. If a subject stored in a conventional safe is a document, the safe can only preserve the document. It is not intended to prove what is on it and when the document starts its existence.

Banks provide conventional safes to customers for their convenience. After a customer rents a safe, the customer can store items in the safe for secure storage. Each time when the customer accesses the safe, the customer must personally visit the safe, present the key to a representative of the bank, and sign an access from which contains access date and time. The bank representative then uses both its key and the customer key to open the safe. This system is safe because the bank employees cannot open the safe without the customer key.

In providing this conventional safe service, the bank keeps track of each access by the customer, but makes no attempt to track the stored items as to their identities and deposit times. Clearly, access to a conventional safe is inconvenient and time-consuming. Banks provide this service probably for goodwill rather for meaningful revenue. The user of the safe must make a trip to the bank for each access, stand and wait in a line for a customer representative, and sign an access log form. Due to the nature of this service, a customer can rent a safe only from a local bank or safe provider.

Since the advent of the Internet, it is obvious that files can be stored on a remote server. The service of accepting and maintaining files on a server, which is accessible by browser, has been long existed. Using a server to keep files is a natural and obvious extension of the server's storage capacity. This storage service may include software backup services. They all have the common goal that system allows the user to get a copy the files from the server if their original files are lost.

Some companies have provided file storage services by using an online file deposit system ("OFDS") for years. Those companies provide a central server where each of the remote customers is assigned a folder associated with a user account (e.g., a safe name) so that customers can store files. Some companies may provide additional features of improved security for the stored files. For example, the customer may encrypt the files using the password of the user account.

The online file deposit system is similar to the coventional safe in its utility. When the originals of a customer are destroyed by fire, natural disasters, or acts of crimes, the customer may copy the files from the server as the secondary evidence of the lost original files. Such secondary evidence is universally acceptable in court in the case that the originals are unavailable. Even if the secondary evidence is unacceptable in some cases, the file deposit system can help the owner reconstruct information in the original files. However, the system does not provide any proof of the time at which each of the items starts its existence. Nor is it possible to authenticate the substance of the file. For example, after the original is destroyed by a fire, a person can reasonably question if a copy recovered from such a system is a true copy of the destroyed document because the owner is unable to provide good evidence to conclusively exclude the possibility that the file recovered from the server is actually created after the original has been destroyed.

Moreover, the current file deposit system does not fully address all safety issues. In a typical system, the files are encrypted by using the account password. This password must be stored on a server for authenticating the user or owner. Even if the password is stored in a hashed form, it is still possible to reverse the hashed form to the original password. One can write a small program for reversing a hashed password to the original password. This can be done by randomly generating a series of passwords, and use the same hash algorithm to produce the hashed passwords, and compare each of the resulting hashed passwords with the stored hashed password. By repeating this process, when a match is eventually found, the randomly generated password is the real password. Thus, as long as a security measure is based on account password, the files can be accessed by anyone who has access to the server. Moreover, after the password is used in encrypting files, it is very burdensome and risky to change login password. Accordingly, many current vendors do not allow safe users to change passwords.

Nor the security method used in a current file deposit system can prevent hackers from accessing stored files. In such a system, hashed passwords and account names must be kept in a file. If a hacker gets this file by illegal means, the hacker can reverse all hashed passwords to real passwords for all accounts. Therefore, the hacker not only can get login names, but also can get the passwords for decrypting stored files. Therefore, this security method is not safe enough to prevent illegal and illegitimate access. Therefore, any safe system that uses account passwords as encryption keys is not secure enough for storing highly confidential information such as patent disclosure, trade secrets such as product formulas, important financial data and business information, and wills and trusts.

Therefore, there is a need for a new online file storage system for storing files which can be easily accessed anywhere; there is a need for an online file storage system which is safe and secure; there is a need for an online file storage system which can provide proof as to the time of existence of the stored files and the substance of the files when necessary; and there is a need for an online file storage system that allows other users or other persons (i.e., intended recipients) to access the stored files for the purpose of establishing the substance of the stored files; and there is a need for tracking the access history of the files. Due to the substantial differences, such a file storage system is referred to as secured online file lodging system.

SUMMARY OF THE INVENTION

The present invention is a Secure Online File Lodging System ("SOFLS" or "Digital Safe"), which provides plural file lodging safes or safe accounts for remote users for securely keeping files, which may be text files, application files, image files, video files, sound files, computer programs or source codes, executable programs, and anything that can be converted to digital files.

The user can have any of the files encrypted by using account password, single encryption key, and two keys combination. The keys are not permanently saved on the server. The user can download any of the files from the server. Upon downloading, the server generates a page prompting the user to provide the keys for decrypting the file using the same encryption algorithm.

The safe owner can also order an authenticity certificate that certifies to the uploading date and time and the substance of the file to be certified.

The user can grant the right of access to any file to any of the other safe users so that they can view, download and decrypt the authorized files.

The user can directly order authenticity certificates for other safe users, make them accessible from recipient safes, and have them sent to recipient email addresses. The user may also order hard-copy files in encrypted or decrypted states together with an authenticity certificate for intended recipients.

The system of the present invention comprises:

A fully functional server connected to the Internet;

At least one client computer that is connected to the server by a network connection so that the server and the client computer can exchange data according to a web protocol used in the Internet;

The system further including the following devices and features:

means for managing safe accounts;
means for uploading files;
means for encrypting the files according to user's choices;
means for downloading and deleting files;
means for writing file information such as uploading date/time, file size, encryption method, and owner identity or name permanently for each of the uploaded files for each of the safe accounts;
means for granting the right of access to a file to the safes of other persons so that the other persons are allowed to download and decrypt the file; and
means for generating a certificate for authenticating the existence of a file and, optionally, the substance of the file.

The system may contain optional program code for verifying the condition of uploaded files, program code for selectively accessing files from the outside of the safe accounts by any user, program code for managing a safe by at least two owners, and program code for printing a hard-copy certificate for authenticating the existence and substance of any of the files.

The invention also includes a process for keeping files, the process comprising the steps of:

opening a file lodging safe ("safe") or a user account by a user from a client computer;

logging into the safe or user account by the user;

uploading a file to the server of the system for permanent storage;

encrypting the file according to user's choice on-the-fly or after the file is uploaded;

creating and saving file information such as uploading date and time, file size, encryption method, and owner data for the file;

downloading the file by the user while the file is being decrypted for subsequent access;

granting the right of access to a second person so that the second person is allowed to decrypt the file and download the file directly from the second person's safe;

optionally, generating a certificate for authenticating the existence of the file and the substance of the file;

optionally, verifying the condition of the uploaded file any time after the file is uploaded;

optionally, maintaining the file-accessing history information including the status of the file; and optionally, maintaining the file-accessing history information after the file is deleted.

The invention also includes a compute program product having computer readable medium, and embedded program code which includes:

program code for managing safe accounts;
program code for uploading files;
program code for encrypting the files according to user's choices;
program code for writing file information such as uploading date/time, file size, encryption method, active/inactive status, file condition, and owner identity or name permanently for each of the uploaded files for each of the safe accounts;
program code for granting the right of access to a file to the safes of other persons so that the other persons are allowed to download and decrypt the file;
program code for generating a certificate for authenticating the existence of a file and, optionally, the substance of the file.

This online file lodging system of the present invention is different from the conventional online file deposit system in the capability of maintaining the file information for each file, sophisticated encryption methods, full access control for each file, and detailed methodology for proving the uploading time and the substance of each of the lodged files.

BRIEF DESCRIPTION OF DRAWINGS

FIG. 2 shows the page for logging into a safe.

FIG. 3A shows the page for recovering the password for a safe.

FIG. 3B shows the page for entering the answer to a security question.

FIG. 4A shows the page for registering a safe or user account.

FIG. 4B shows the page for changing the password of the safe.

FIG. 4C shows the page for updating the address and other basic information of a safe owner.

FIG. 4D shows the page for changing password after the password has been exposed to someone else.

FIG. 5B shows the page for prompting the user to provide encryption key in a verification step after a file is uploaded.

FIG. 5C shows the file download dialog used in testing an uploaded file.

FIG. 5D shows the page for prompting the user to confirm whether the file is good at the end of a verification test.

FIG. 6A shows the default view of "File Summaries" showing owner's files.

FIG. 6B shows "File Summaries" of the files that the owner has right to access.

FIG. 6C shows casual files in a safe folder.

FIG. 6D shows the page for downloading a non-secured file.

FIG. 6E shows the page for decrypting and downloading a file.

FIG. 7A shows "File Details," including uploading date/time, file size, encryption method, and other users or safes that have right to access together with a left-side menu.

FIG. 7B shows the page for changing the status of the file in the safe.

FIG. 7C shows the page for deleting a file.

FIGS. 7D-7F show the pages for changing right of access for a single file.

FIG. 7G shows the last page for revoking right of access for a single file.

FIGS. 7H-7J show the pages for ordering electronic certificate for a single file.

FIGS. 7K-7M show the pages for ordering a hard-copy certificate for a single file.

FIG. 7O shows the steps for granting right of access to a single file.

FIGS. 9A-9C show the pages for granting right of access to a plurality of files in a safe.

FIGS. 9D-9E show the pages for revoking right of access for any of the files in a safe.

FIGS. 10A-10C show the pages for ordering authenticity e-certificate for plural files.

FIGS. 10D-10F show the pages for ordering a hard-copy of authenticity certificate for plural files.

FIG. 11 shows the page for decrypting a standalone file that has been encrypted according to the method used by the safe system.

FIG. 12 shows the page for conducting search for files that are marked as global files.

DETAILED DESCRIPTION OF THE INVENTION

Files in this disclosure mean text files, word-processor files, image files, video files, sound files, and anything that is capable of being transmitted through the internet.

I. The Components of the Online File Lodging System

Figure 1:
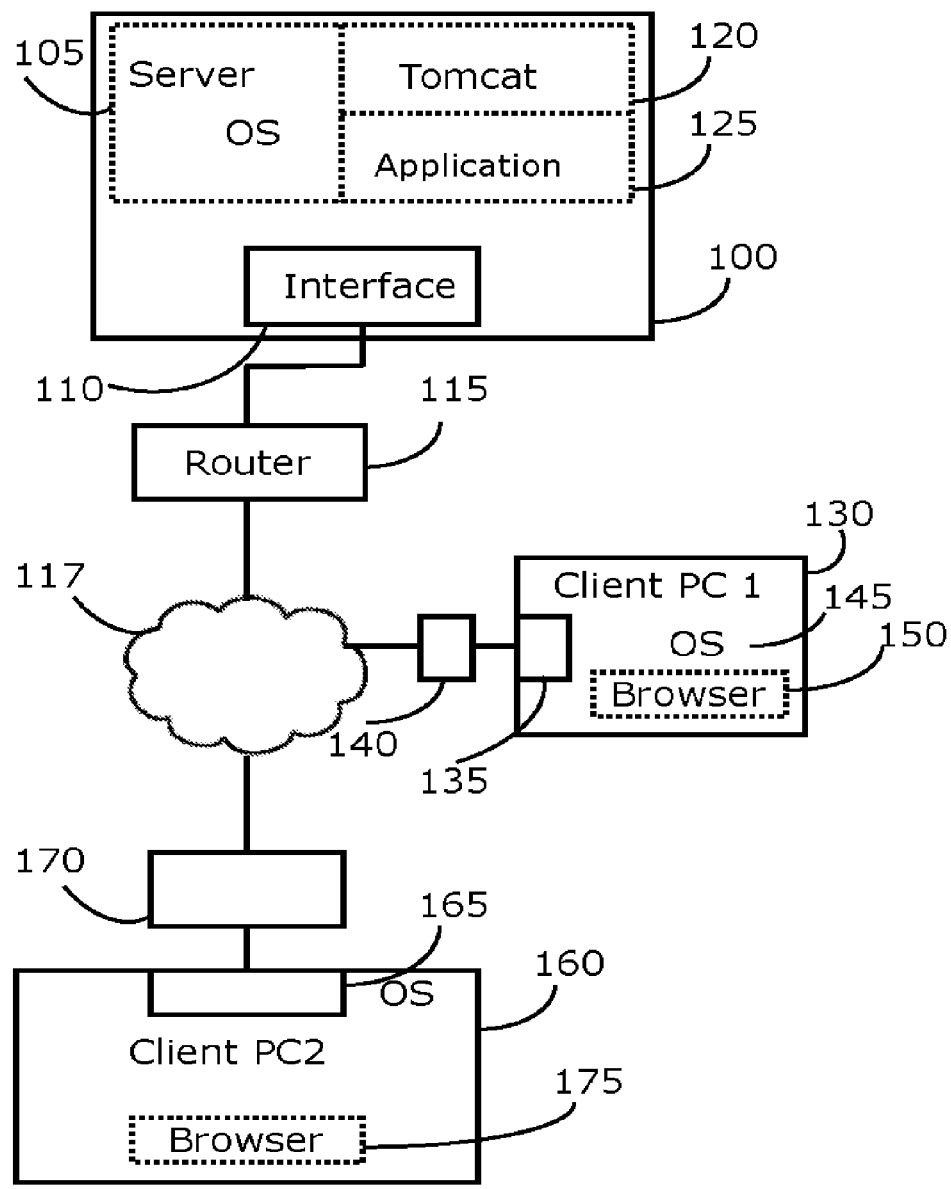
FIG. 1 shows the basic hardware components of the Secure Online File Lodging System (SOFLS) of the present invention.

The Online File Lodging System (FIG. 1), also referred to as online digital safe, comprises a server 100 and client computers 130 and 160, all of them are connected in a network so that they are able to exchange data using common data transmitting protocol such as TCP.

The server 100 is running an operating system 105 and is fully functional, has a network interface 110, and is connected to the Internet 117 through a router 115. In one version of the embodiment, the server is an Intel D945PNS motherboard with a Pentium D 840 processor operated by Fedora Core 5. Although the system came with a package of Java tool, a Java Development Kit (JDK version 1.5.06) is installed for compiling Java class files. In the ext folder inside the lib folder of the Java Runtime Environment (/usr/share/jdk/jre/lib/ext), activation.jar and mail.jar are placed. To handle file uploading, a package known jspsmartupload (or equivalents), which includes several class files, is used. The server is installed with Apache Tomcat 5.5.15 and MYSQL 5.0.27, which come with the system. To allow Tomcat's Java class component to access the MYSQL database, mysql-connector-javajar is placed inside the lib folder under the common folder of the Tomcat installation folder. All server application files of the present invention are placed in one single application folder. The source code files in JSP format are directly placed in this application folder or sub-folders, and Java class components are placed in the class folder under WEB-INF. The arrangement of folders, versions of Java components, and all jar files meet the requirements of the Tomcat application or be appropriate for the Tomcat application.

The client computer 130 is also operated by its own operating system, has a network interface 135, and is connected to the Internet 117 through an interface 140. The client computer 130 runs a browser or a similar HTML rendering application so that it is able to browse standard web pages rendered by the server 100. Optionally, a second computer 160, which is also operated by its own operating system, has a network interface 165, and is connected to the Internet 117 through its router 170.

MYSQL database application (not shown in FIGS) is used for safe account management and for storing files. If speed and productivity is not an issue, it can be completely dispensed with. For example, Perl database may be used as an alternative. Files may be stored in a tree of folders that are specifically for users.

In this system, each of the client computers is able to access the server using WWW protocol and access the web pages sent by the server according to any of the current standard HTTP protocols (1.0, 1.1, and 1.2).

The application source files developed for this invention include JSP pages (which may include embedded JavaScript or other script) and Java class files. The application folder includes two folders: lib and classes. The lib folder may contain some jar files for run-time use. Within the class folder, there might be plural folders with different names, each containing one class of compiled Java files. In such a system, the JSP files often provide direct interfaces with the user. The components that are used repeatedly are compiled as Java class files. A proper web page on a browser can access the database on the server through the JSP pages or Java class Java Bean or Java Servlets.

A JSP page can be run directly under the application folder if it meets the requirement of the system and complies with JSP syntax standard. Each of the Java class files is compiled to form a class file first before it is placed into a proper class folder. The Java class file is compiled using Javac from Java Development Kit (1.5.06), whose jre/lib/ext contains necessary API jar files such as mail.jar and activation.jar.

Since this Online File Lodging System is intended to securely keep highly confidential files with a capability of approving the existence of the files and substance of the files in the event of the loss of the original files, it is desirable that the system is deployed in at least two independent data facilities. If duplicate data facilities are unavailable, it is necessary to keep files on two sets of permanent media that are stored in two separate locations. If the data residing on the system's hard disks are permanently lost or irrecoverably damaged, the backup data media at the second location may be used to retrieve lodged files.

II. Use of the Secured Online File Lodging System

The main use of this file lodging system is that a user can upload important files that are encrypted by user-provided keys. When the user needs to prove the earliest creation time, existence, and substance of the file, the user can download it from the server with a certificate. The system provides at least two menus: Access my Safe and Register a safe. In addition, user instructions menu may be placed on a home page as an option so that a prospective user can learn its basic concepts. The system is discussed from the user prospective while server operations are described for clarity, as follows.

First, a user can open a safe or user account from the client computer and log in the safe. After the user logs in, the user can see all of the files in the safe and the files of other safes the user has right to access.

Second, the user may upload files to the server for safe storage. In the process of uploading a file, the user is prompted to select a security method from a list of choices.

Third, upon submitting the file-uploading page, system uploads the file to a temporary folder or a folder designated for the user's safe account.

Fourth, the server encrypts the file according to the user's choice of security methods. Encryption may be performed on-the-fly or anytime before the file is written into the database table or final storage destination on the server.

Fifth, the server creates basic information about the file, including uploading date and time, file size, encryption method, and owner name, and writes the information into the database table for permanent record.

Sixth, the server writes the file into a field of a database table or, in the alternative, in the safe's folder.

Seventh, the user can download the file anytime as long as the user is able to authenticate the safe account or owner identity, and provide correct encryption key(s) if the file is encrypted.

Eighth, the user may grant right to access to a file to another person (also referred to as "second user" "second person" "third party user" or "third parties" or "recipients" in this disclosure) who has a safe on the server or who is offered a guest safe account.

In addition, the user may download a certificate, as a web page or PDF file, containing the basic information about the file together with the file in an encrypted or decrypted state.

Optionally, the user may request that an authenticity certificate be sent to a second user. The certificate is a document shown in FIG. 8 or just a document containing a simple statement. This certificate is saved in the database table "certificates" or the safe account folder. In the alternative, the certificate may be written into the safe folder of the second person's safe account or mailed to the email address of the second user. It is preferable to issue a web message informing the availability of the certificate when the second user logs in its safe next time. If the second user is also granted right of access to the file, the second user can get both file and the certificate.

The owner of the safe may also order a hard-copy certificate (FIGS. 7K-7M, 10D-10F) for authenticating a file and the substance of the file. This can be done online from a web form. In ordering the certificate, the user has the option to include a hard copy of the file to be sent to the second user, and is prompted to provide encryption keys for decrypting the file when the user places its order. After the order is submitted, the server retrieves the file, decrypts it, and saves it together with the certificate in the certificates table or the account folder. A printer connected to the server may automatically print the decrypted file according to prearranged schedule or in response to a manual command of a server administrator.

The hard-copy file may be produced and automatically bound as a booklet by a printer that has binding function. The staff of the safe system may use commercial applications that support the file formats of decrypted files to print hard copies. E-certificate in web page format may be printed using a printer connected to the server or any client computers displaying the certificate. E-certificate in PDF may be printed using any application that supports PDF format. Scanning device and proper image software may be used to check printing quality (e.g., image density and text margins). The printing operator of the system may conduct only limited visual inspection to ensure that files are printed properly without infringing the privacy of the files.

Visual inspection may be completely dispensed with if the user has downloaded the file, decrypts it, and sends a feedback concerning the file conditions to the server. If the user has provided a good feedback on the file conditions, the operator of the system only needs to ensure that the printer functions properly and sufficient image density exists in the printed file. Therefore, careful visual inspection of the printed file by humans is unnecessary.

For the files that user has failed to conduct a downloading verification test or failed to send a feedback, visual inspection of the quality of the printed files may be necessary. The files encrypted using a single key or two keys should be for the the files required the highest security, while other causal files do not require privacy. Therefore, files may be printed in different printing shops with different levels of privacy. For the highest security files, visual inspection of file quality by humans may be completely prohibited.

Optionally, if the user agrees to the waiver of privacy of a file, the user may provide the keys to the printing staff of the system and have a copy of decrypted file prepared for the user. The file may be inspected before it is sent to the designated recipient.

The system administration finally mails out a hard copy of sealed authenticity certificate together with the file to be certified to the designed recipient.

Optionally, because the file lodging system may use advanced authentication method in authenticating user identity, the files may be designated as global files that can be directly accessed by any person accessing the server. While safe name and safe password are not used in encrypting files, logging into a safe is a prerequisite for accessing files. An option may be provided so that the user may designate his files as global files that may be accessed directly without using a safe. However, for the reason discussed, the option should not be available to the files encrypted using safe account password and unencrypted files.

Optionally, the file lodging system may also implement a verification step for verifying the condition of an uploaded file. When a file is uploaded, the user is prompted to verify the condition of the file by downloading the file for a verification test. If the user can open the file, the user then is asked to confirm whether the uploaded file can be opened successfully. The substance of user's confirmation may include the condition of the file. This step helps the user find those files that are damaged during the uploading process.

III. Web Interface and Software Components

For a real secured file lodging system, the details of the real software components shall not be disclosed to the public because such details would be sought by hackers and thus reduce the security of the system. However, it is impossible to hide the functional features because any user in the public can use the system. Moreover, at this stage of information technology, it is easy to develop program code for embodying the concept for any platform under any operating system. Therefore, the program code and database table structures in this disclosure are examples only. They should not be used in a real file lodging system without sufficient adjustments to all issues related to files security.

The software developed for practicing this invention includes the server-application and the code for web browser.

The main components of the system include safe account managing component, file uploading component, file downloading component, access-controlling component, encrypting and decrypting components, file verification component, certificate-creating component, hard-copy certificate ordering component, and email notification component. Not all of them are essential for the practice of the invention. Solely for the convenience of disclosing this invention, all software components that jointly perform a well-defined function are referred to as a component.

Each of the software components may have code in two or more different software modules or files. For example, the uploading component contains both client-side code for browsing the client computer and server-side code for receiving the files to be uploaded, getting current system time, getting file size and ownership information, and writing them in database table or proper folder in none-database implementation. Likewise, the encrypting component works on-the-fly when the file is being uploaded. Thus, it is hard to separate the uploading component from the encrypting component because they work in a cooperative manner. After a file is uploaded, the server automatically updates the file-info table reflecting the changes caused by the file. It is therefore obvious that some code is shared and used by many components.

Figure 6F:
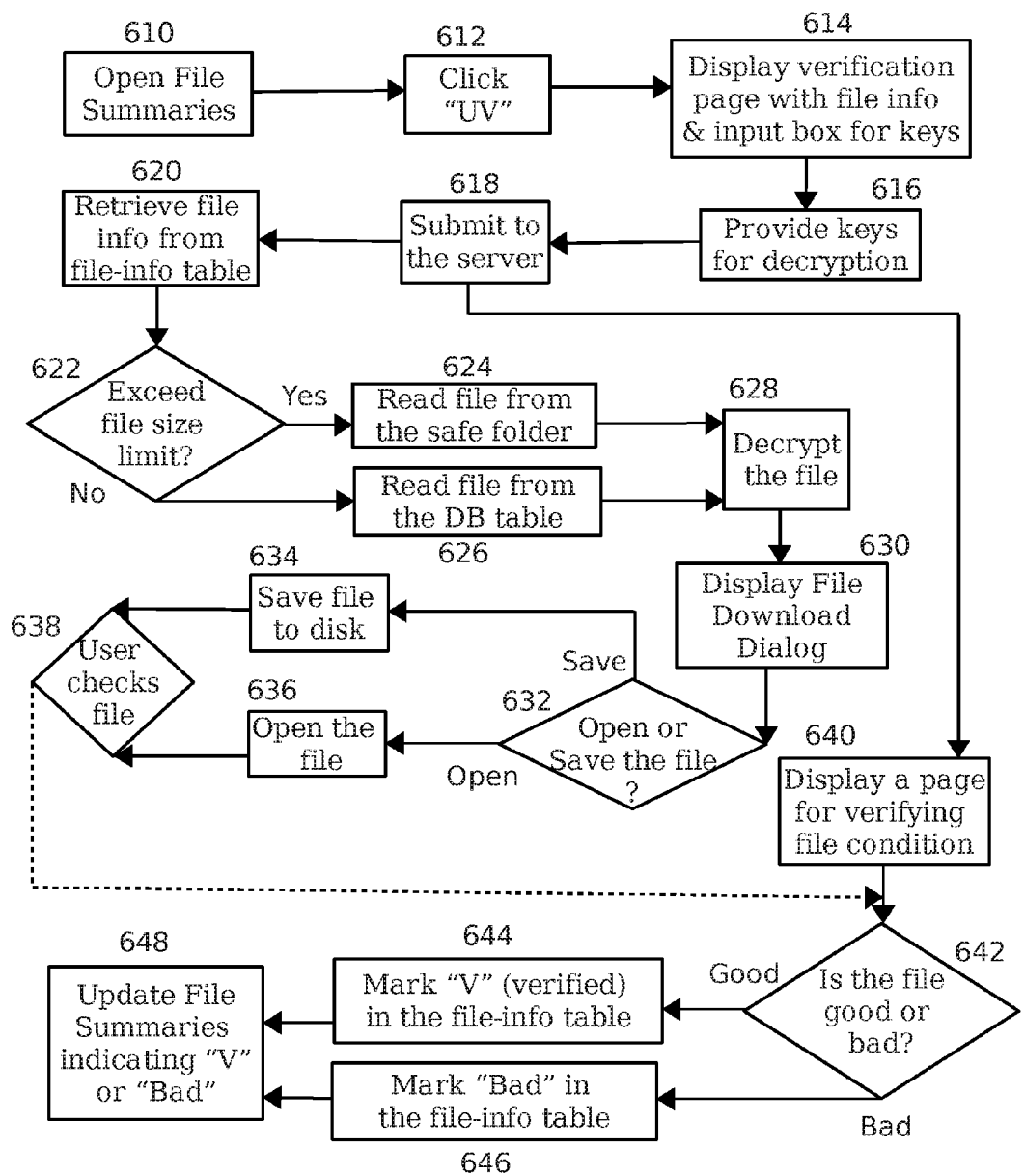
FIG. 6F shows the steps for verifying if a file is good.

The home page of the Online File Lodging System contains at least two menus on the navigation bar: "Access My Safe" and "Get A Safe." By clicking on the "Access My Safe" button, the user can reach the page for logging in safe (FIG. 2). By clicking on the "Get A Safe" or "You can create a free safe, click "Sign Up" button on FIG. 2, the system opens the "Register A Safe" (FIG. 4A). The "Forget Password" may be provided for recovering password (FIGS. 2, 3A, 3B). The user may open an instruction page by clicking the "help" button in FIG. 6A.

A. The Safe Account Management

In this disclosure, "second user" means any person other than the owner of the safe in discussion. It includes second person, second user, a third-party user, third parties, and file recipients. It may mean corporate entities, courts and government agency that do not have safe account on the system.

A registered user can access the Online File Lodging System by opening a page for logging in a safe (FIG. 2). On the log in page, a registered user types in a safe name and a password into the "Safe Name" and "Password" boxes respectively, and hits the "Enter" key of the client computer or clicks on the "Login" button. In response, the system gets the values of the safe name and the password that the user has provided and compares them with the values in "safe_name" and "password" fields for all the records in the database table user_info. If a record is found, the user is allowed to sign in.

If the user forgets the safe password, the user can retrieve password by clicking on the "Forget Password" link (FIG. 2). The first page opened by this link contains an input box for safe name (FIG. 3A). The user types in a safe name and proceeds. In response, if the safe name exists on the database table "user_info," the server retrieves the value from the "question" field of the record in the user_info table, and sends a page to display it together with an input box (FIG. 3B). The user then types in an answer to the security question in the box and hits the "Enter" key or clicks on the "Recover" button (FIG. 3B). The server gets the value of the answer that the user has just typed in and compares it with the value in the "answer" field of the record for the user in the database table "user_info." If the two values are identical, the user is treated as the true owner of the safe, the server sends the password to the user's email address, and sends a message like "Password is sent to your email address!" If the answer is incorrect, the server responds with a message that the user failed to prove its identity and sends the page for recovering password again. If the safe name the user has provided does not exit, the server sends a page to display the message that "The safe name you provides does not exist!" and prompts the user to retype a safe name.

When the server prompts the user to re-enter data for recovering password, the server retrieves the values that the user has typed and fills them into respective input boxes for variables/names on the next page (except the password) so that the user does not have to re-type everything in next attempt. In each of the responses, the server first gets values of the variable/names and then fills each of the variables with the previously entered value.

The user can go back to the login page by clicking on the link of "Back to Login."

The "user_info" table contains the fields "password", "question" and "answer." It also contains "regst_password", "regst_question" and "regst_answer." The duplicate security-related fields are used so that the user is allowed to change safe login password. If the safe password is used as an encryption key, it cannot be changed. It would require that all files be decrypted and re-encrypted whenever the user changes the safe password. This change would cast doubt as to the file uploading date/time and its authenticity, and increase the risk of damaging the files in changing encryption keys. The problem can be serious if the safe contains a large number of encrypted files. After the key is changed and if the server or network equipment malfunctions in the process of re-encrypting the files, at least one of the files may be damaged permanently while other files are still encrypted by the old key. Also, the change may require a large amount of CPU usage. Therefore, it is preferable (but not required) to use an encryption key permanently. When the user registers for a safe, the value of its security question, the value of its answer to the security question, and the value of its password are written to both sets of the fields. The values in the "regst-" set of fields are permanently saved for encrypting and decrypting files only. The server uses the fields "password", "question" and "answer" for authenticating the safe user, and the user can change the values in those three fields whenever security concerns arise. Change of the registration password may be allowed only if the safe does not contain any files encrypted by the password. Change to registration password can be made through a web form and necessary back-end Java or other programs.

When the user changes the safe registration password, the user implies that the password is no longer safe, and the files encrypted using the registration password may be decrypted by unauthorized persons. The user can also change the password for the safe, thereby preventing those who knew the password from accessing the safe. When a file is encrypted using safe registration password, change of the login password is the only feasible security measure to prevent them from accessing it. Therefore, it is preferable to impose the restriction that the files encrypted by using safe registration password as encryption key may not be accessed from the outsides of the safe. The user may not make the files, whose associated "security" fields contain a value denoting safe password, as globally accessible files. For the same reason, unencrypted files may not be accessed globally. For the highest security, the user can use two-keys security method without making the files globally accessible. To access this type of files, the user must have correct safe password and the correct keys for decrypting the files.

When the user logs in the safe successfully, the current time of the server is saved in the "login_time" field of the database table "user_info." If the server is unable to authenticate the user because of a wrong password or a wrong safe name, the system sends the login page again with the old password value cleared, and sends a page to display an error message like "Incorrect password." The user is prompted to log in again.

If the user provides a correct safe name, the user may be allowed to make several attempts to log in the safe. The number of failed attempts may be stored in a session object. If the total number of the failed attempts exceeds an allowed limit, the server may temporarily disable the connection (regardless of how many safe names the person tries) and send warning email to the owner's email address. However, this feature may burden the users who access the system from public computers.

In implementing this security feature, a session object is declared for the connection (like a shopping cart for an unregistered user). After two or three login attempts, the system prevents the user from making further attempt. The number of failed attempts is accumulated for each of the failed login attempts. If the total number of failed attempts exceeds a permissible number, the server informs the user that no more attempts are allowed for security reasons, and a contact phone number is provided to the user. The number of failed attempts for the safe is reset to zero whenever the user has successfully logged in the safe. This permissible number should be set to a reasonably large number because it is intended to prevent hackers from gaining authorized access to user accounts by using an iterating program and should not impose an unreasonable burden on the users who may have to make several attempts to log in a safe manually. Also, it is possible that many users share the same computer and is not in the position to fix computer issues attributing to failed attempts.

To register a safe, the user starts the registration process by clicking on the "Register a safe" on the home page or the "sign up" link at the button of the login page (FIG. 2). In response, the server sends the registration page (FIG. 4A). The user then enters basic information into the proper boxes, and hits the "Enter" key or clicks on the "Register" button. In processing the registration request, the server first verifies whether the safe name is available. If the safe name is used, it responds with a message prompting the user to select another safe name. In returning this message, the server gets the values for all variable names, and fills them in the input boxes for the variable names in the new form so that the user does not need to re-type all of the data in next attempt except for the passwords. Optionally, the user may use an email address as the new safe's name.

After the server ensures that the proposed safe name is unique, the server saves all the data in proper fields of the database table "user_info." In addition, the server may also send a message to the user's email address to confirm the registration of the safe without disclosing the password. If the server encounters no error, it sends a page to display the message "An account is registered successfully!" Otherwise, the server sends a page to display the message that "The server is unable to register a safe for you." In any case, the server gets values of all variable names that the user has typed, and fills them in the respective boxes on the responsive page so that the user can correct errors in another attempt of registration.

To register a safe successfully, the safe name must be unique, and proposed password, email address, and access code are in compliance with optional formality requirements. For example, the server may require that the safe name contain at least four characters, that a good password have the length between a minimum number of characters and a maximum number of characters, and contain both numeric digits and letters. An access code may be implemented using a fixed number of characters for the convenience of the users.

The access code is used for account verification purpose. When the system holds a large number of safes, it is possible that many safe names are similar, and a user may type in a wrong safe name by mistake. This kind of errors can be serious if a user grants right of access to a confidential file to a wrong safe. Access code is not used for security reason. Other data such as account owner name, street address, city, and zip code may be used as supplemental authentication data. However, it is preferable to use an access code because it is the most effective and simple way to eliminate identity mistakes.

When a user grants right of access to a second user, the user must provide both the safe name and the access code. In order to grant the right of access to the second user, both the safe name and the access code must match with the values for an account in the database table "user_info." It is highly improbable that a user inadvertently types incorrect safe name and access code that happen to match the safe name and access code of an unintended safe.

There are two ways of implementing this combination verification scheme. One of the methods is that the access code is stored in an independent field. In this case, the user must provide the access code during registration. The access code may be a portion of the characters from the value of other database table field (just like the last four digit social security number used as PIN number of a shopping account). The table "user_info" includes the "safe_no" field, which holds unique safe numbers mainly for convenience. Therefore, the access code, for example, may be the last 6 digits of the safe number.

Optionally, the server may use a two-step authenticating method. It first retrieves the user's safe account record from the database table "user_info," and determines if the field of "access_code" (Not used in current database tables) has a value. If the field has a value, the server uses this value as access code. If this field is empty, the server takes the last portion of the safe number (e.g., the safe_no field) as access code. In this case, the server must inform the user of this access code on the system's home page so that the user knows it. Access code so implemented may be changed from time to time by resetting the "access_code" field of the account record.

After the user registers a safe successfully, the user is prompted to log in the newly registered safe (FIG. 2) or can access the login page by clicking "Back to Login."

B. Upload Files Using Various Security Methods

By opening the page associated with "File Upload" on the navigation bar, the user can upload a file into the server (FIGS. 5A-5D). On the page in FIG. 5A, the user is asked to select a security method, provides a description for the file, and types in the file path where the file can be found to upload. The description field is used to store a short description so that the user can identify the file. The user can pick up a file path by clicking on the "Browse" button and using the path-finding dialog. The user must select one of the security methods under the "Select a Security Method" before the file can be uploaded successfully. The options for security methods include "Send encrypted file," "Use single encryption key," "Use two encryption keys," "No need to encrypt," "Encrypt by safe password," and "Put in the folder (no need to keep track of the file)." The default options might be "one key encryption." The details of definitions are as follows.

1. Casual Files and Lodged Files

The safe user may upload a file into the server in two different ways. The user may deposit the file in the root folder of the safe account for causal storage only or lodge the file in the database table. Casual files (table view in FIG. 6C) are placed in a safe's folder while the lodged files are stored in either database table or the safe's folder if it is larger than the size of the database field. Despite the difference, the server has to keep track of their physical locations so that the server can find and to download it. The real differences are that the server does not issue a unique system-wide file number for casual files, does not track them in each operation, and does not store any information permanently. In comparison, the server keeps track of all lodged files concerning uploading, access histories and even deletion reason. Therefore, the server needs much less storage space for casual storage files. When casual files are deleted, the server does not keep anything about them.

2. Various Security Methods

Figure 5A:
FIG. 5A shows the page for uploading a file into the safe.

All available security methods are shown in FIG. 5A and their meanings are as follows:

"Send encrypted file" means that the file has been encrypted before it is uploaded. When this option is used, the user is solely responsible for decrypting the file. The file, if properly encrypted, cannot be opened by anyone.

"Encrypted by safe password" means that the file is encrypted by the password of the safe account. This is not the securest method because the server administrator may be able to open the file. When a good cryptographic hash functions are correctly used for authentication, password cracking through decryption is considered infeasible. In theory, however, it is still a possibility.

"Use single key encryption" means that one single key is used in encrypting the file. The server uses the key in decrypting the file. The details of the encryption method such as the algorithm cannot be disclosed because it would increase the risk that someone can decrypt the file. The only requirement is that the user provides a valid key when uploading the file. Upon uploading the file, the server first checks the validity of the key, and then uses the key and the encryption algorithm to encrypt the file before the file is being written in the "file_content" field of the file record in the database table "file_info" or if the file is over-sized, it is written in the safe folder. Upon being written successfully, the server immediately deletes the key from the server's memory. The server does not save the key. However, the server saves in the "security" field the information that is sufficient for instructing the server to decrypt the file using the same key and same algorithm when the file is downloaded. When the user makes a request for downloading the file, the user is prompted to provide the key. The server uses all necessary information in the "security" field to construct the decryption method and uses the key to decrypt the file on-the-fly. Upon successful decryption and download, the server again permanently deletes the key from its memory. The key is not saved on the client computer.

Many encryption algorithms are well known. One of them is Blowfish (designed in 1993 by Bruce Schneieris a symmetric block cipher that can be used as a drop-in replacement for DES or IDEA. It takes a variable-length key, from 32 bits to 448 bits, making it ideal for both domestic and exportable use. Other standard encryption algorithms using 64 to 128 bits keys are available in commercial software packages. The server may randomly use one or many of them as long as the server is able to reconstruct encryption method for each of encryption methods. To ensure that the file can be successfully decrypted, it is desirable to do a verification test after the file is uploaded.

"Use two key encryption" means that two encryption keys are used in encrypting a file. The server also needs the two keys in decrypting the file. The details of the encryption algorithms are not disclosed for security reason. No matter what keys are used, the only requirement is that the user must provide the same two keys (key 1 and key 2) without swapping their identities. Upon uploading the file, the server first checks the validity of the two keys, uses the two keys and a right encryption algorithm to encrypt the file, and writes the file into the "file_content" in the file record in the table "file_info," or the safe folder if the file is over-sized. Upon being written successfully, the server deletes both of the keys from its memory. The server does not save the keys. However, the server must save the information that is sufficient for constructing encryption and decryption method using the two keys.

When the user downloads the file, the user is prompted to provide the two keys. The server then uses the necessary information to reconstruct the encryption method, and uses the two keys to decrypt the file. Upon successful downloading, the server permanently deletes the two keys.

"No need to encrypt" means that the file is not a confidential and there is no need to encrypt. However, the file is lodged on the summary page with all details. The file can be tracked by the system just like other encrypted files.

"Just put it in the folder" means that the file is not encrypted and not tracked with permanent records. Therefore, it is impossible to prove the substance of the files and the uploading times afterwards. Because the files are not tracked, this method is only suitable for casual storage of non-confidential files.

3. File uploading Process

One important decision in uploading a file is selection of a security method. After the user selects a security method, provides one or two keys, depending on the selected security method, and provides the path of the file on the client computer, the user then hits the "Enter" key or clicks on the "Upload" button to submit the form (FIG. 5A).

The system uploads the file into a temporary folder (overwriting existing file of the same name). It then gets the current time of the system. The server generates a file number for the file automatically. If the file is not very large, the file is written in the "file_content" field of the database table "file_info." The file number, file size, description, and file type are saved in the table "file_info."

If a file is to be saved in the safe folder due to its excessive size, the whole file path is saved in the "file_path" field. The file name should be unique so that it does not overwrite other files in the folder. The name may be the file number for a lodged file. Regardless of the difference in storage location, all properties of the file are the same as the properties of other lodged files stored in the database table. Limited information on casual files is also saved in the table "file_info" so that the server knows how to find it for download.

If there is an error, the server sends a page to display the message that "The server is unable to find the file!" or "An error occurs in uploading file." If the file is uploaded successfully, the server sends a page to display a file summary for the uploaded file. On this page, the user can click on the button "Print" to print the page or "Save" to save the summary information on the local computer. The server then prompts the user to upload another file. After the user has uploaded all files and responds with "no" to the uploading prompt, the server automatically shows the "File Summaries" page (FIG. 6A).

To ensure that the file can be successfully decrypted, it is desirable to ask the user to conduct a verification test at the end of the uploading process. The user is invited to decrypt and download the file and to see if the downloaded file can be opened successfully and is readable. However, the verification test cannot be used to verify any pre-encrypted file in failed cases because it is impossible to tell which of the two phases, decryption on the server or post-download decryption, causes the failure of the verification test.

Figure 5E:
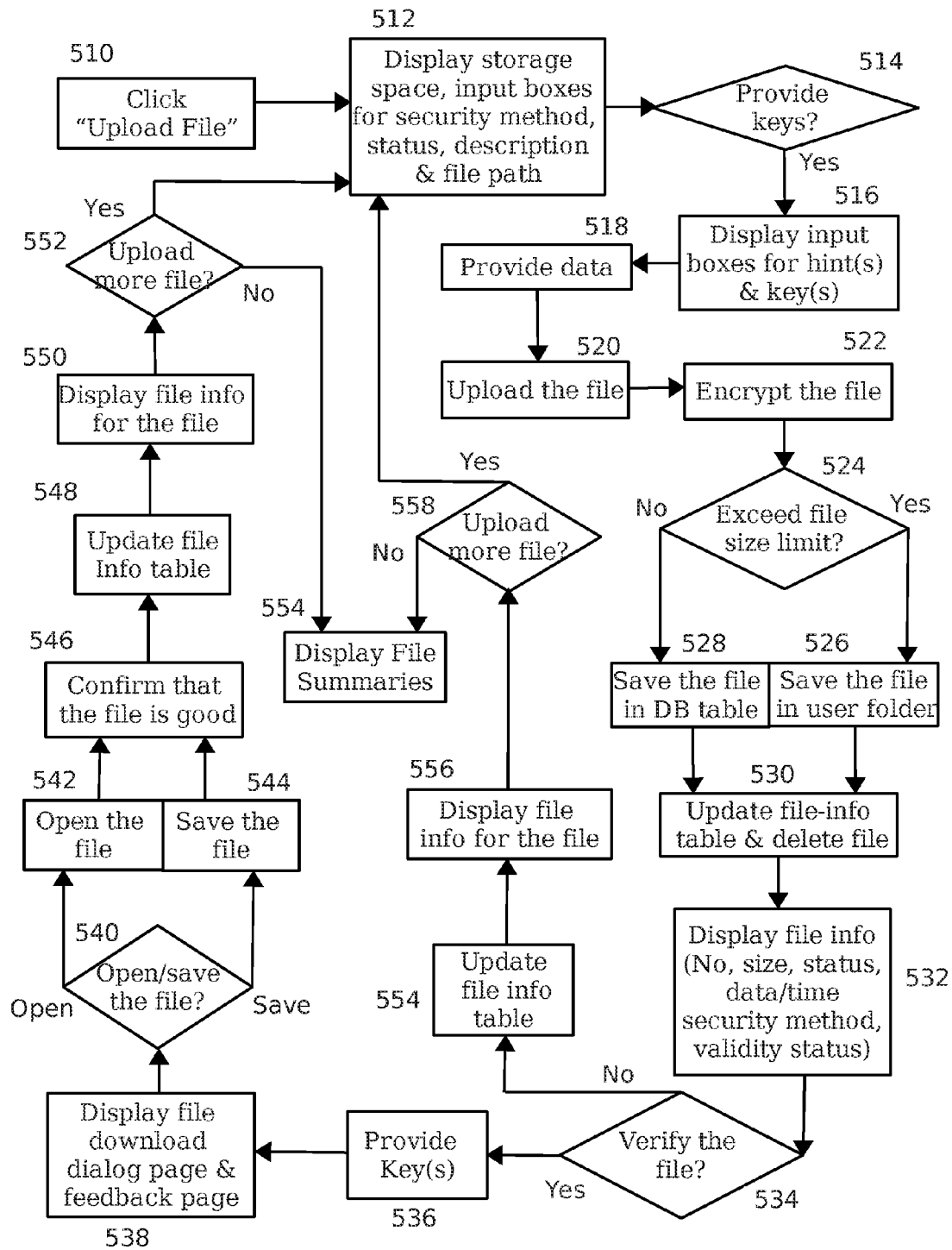
FIG. 5E shows the steps for uploading, encrypting and verifying file.

Regardless of the differences in encryption keys and the final destination, the general steps for uploading and encrypting a file in the preferred embodiment (FIG. 5E) are as follows:

(1) The user clicks on the "upload" button at Step 510.
(2) The server creates and sends an uploading form that contains input boxes for accepting file type, file path, and security methods for the file (Step 512).
(3) The user selects a proper security method (Step 514).
(4) The page generates input boxes for accepting encryption keys and associated hints at Step 516.
(5) The user selects a file to be uploaded by browsing the local computer, and enters one or more encryption keys and associated hints if necessary at Step 518.
(6) The user submits the page for uploading the file at Step 520 (details operation by the uploading application package smartupload is omitted).
(7) The file is first written to a temporary folder and this step may be omitted.
(8) The server encrypts the file at Step 522. The server first retrieves the encryption keys from the database "user_info" table, if the user selects safe password as an encryption key, or from the data submitted by the user, selects a right algorithm, and encrypts the file.
(9) The server determines if the file exceeds the size of the storage field in the file_info table at Step 524.
(10) If the size exceeds the limit, the server saves the encrypted file in the safe folder at Step 526. Otherwise, the server writes the file in the "file_content" of the record for the file in the database table "file_info" at Step 528.
(11) The server updates the file information in the file_info table at Step 530.
(12) The server sends a page to display file information and the selectable options for verifying the condition of the file (FIG. 5B) at Steps 532, 534.
(13) If the user chooses to verify the file condition, the user provides encryption keys in the input boxes and submits the filled page at Step 536.
(14) The server sends a file download dialog (FIG. 5C) prompting the user to save the file or open the file at Step 538, and sends a page for accepting feedback concerning the file condition at Step 546.
(15) If the user chooses to open the file, the server starts downloading the file, and the client computer receives the file and opens the file using a suitable application at Step 542.
(16) If the user chooses to save the file, the server starts downloading the file, and the client computer receives the file and saves the file to the disk of the client computer at Step 544.
(17) The user clicks on "Yes" to confirm that the file is good (FIG. 5D) at Step 546.
(18) The server updates the verified file in the record for the file, indicating the file condition as "verified".
(19) The server updates the page with an option to upload another file at Steps 550,552.
(20) If the user selects "No" for uploading another file, the server sends the File Summaries page at Step 554. Otherwise, the server sends the file-upload page for next file.
(21) If the user chooses not to verify the file at Step 534, the server updates the "verified" field with "U" at Step 554.
(22) The server sends a page including file information and options for uploading more files at Steps 556, 558.
(23) If the user chooses no at Step 558, the server sends the File Summaries page at Step 554 or sends the File Upload page at Step 512 if the user has selected "Yes" at Step 558.

At the end of each uploading cycle, the server deletes the encryption keys from its memory and deletes the original file from the temporary folder. It is important to conduct a file verification test after the file is uploaded. If the file cannot be successfully decrypted, the user should be asked to upload the file again.

If the user chooses to upload a file to the safe folder, as a casual file, the file must be given a unique name, which may be a file_number, or file_number and safe number combination, or server-generated unique name. The server keeps track of the file path on the server so that it can find the file for download in response to a user request. In one implementation, when a file is uploaded, the file is first uploaded into a temporary folder. It is then written into a proper folder for permanent storage. If the file requires encryption by the safe registration password, the file is encrypted before the server writes it in the safe folder. In the alternative, the file may be directly uploaded into the safe folder. Since the safe folder is known, the server may generate an uploading form that includes the final destination path, which is passed to a back-end uploading program. Thus, the file may be directly saved on the safe's folder.

When one-key or two-key encryption is required, encryption may be performed while the file is being uploaded on-the-fly, but this method increases the server's CPU usage or or lock up the network. It is preferred to separate the encryption process from the upload process. The file is uploaded and saved to a temporary folder or safe's folder first, read and encrypted by an encryption program, and finally written in the same folder in a different name or in the file_content of the file_info table. After the file is found to be valid, the temporary file is deleted.

At the end of uploading the file, the server then gets the file size, system current time, file path, and safe name, and writes them in respective fields in the database table "file_info."

Figure 5F:
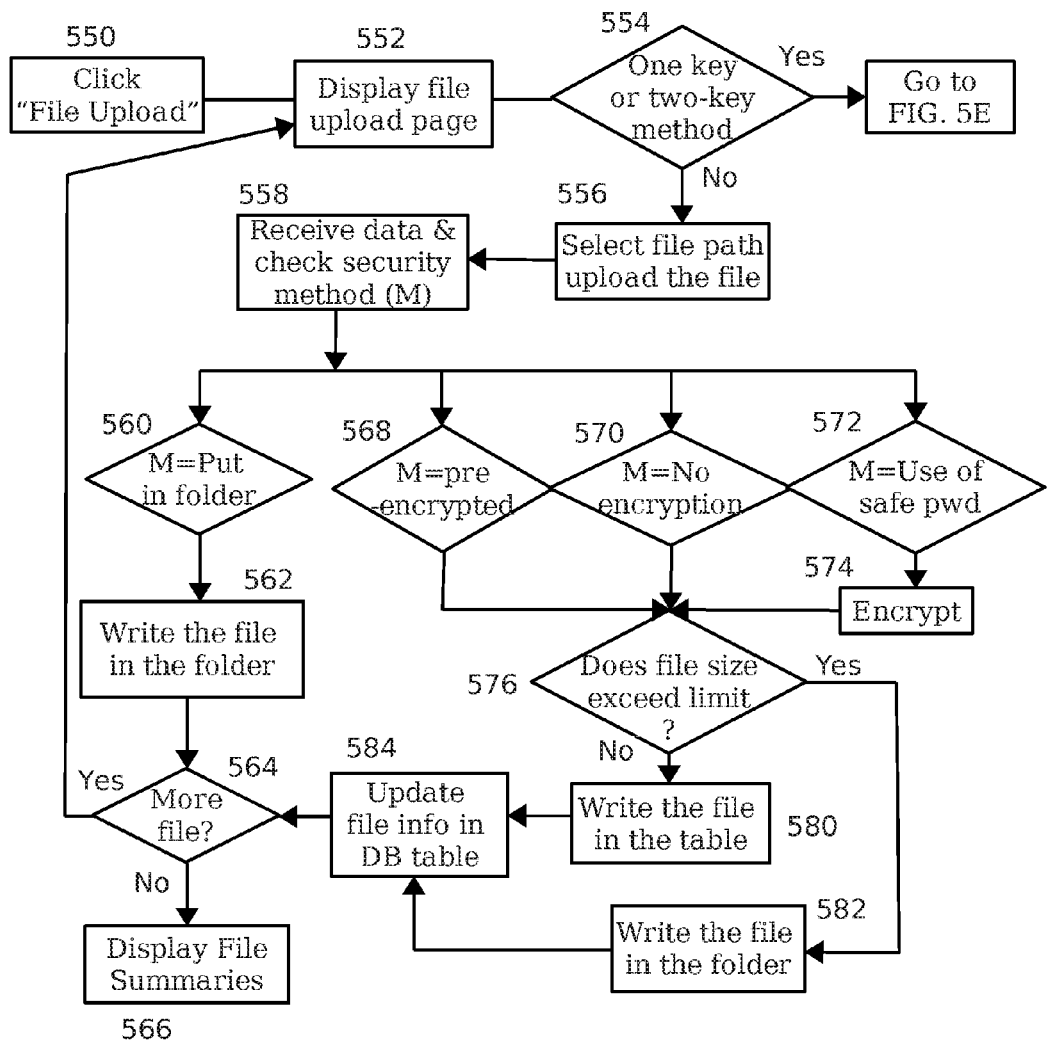
FIG. 5F shows the steps for uploading a file without using a private security method.

If the user can select any security method other than the one-key and two-key methods, the user just selects a method, selects a file status, and finds a file path on the client computer, and submits the form (FIG. 5A). The general steps for submitting a file without using private encryption keys in one implementation are described as follows (FIG. 5F):
  (1) The user clicks on a link for uploading a file at Step 550.
  (2) The user selects any of the security methods except the one-key and two-key encryption methods at Step 554.
  (3) The user finds the file path for the file on the client computer and submits the page at Step 556.
  (4) The server receives the submitted data, receives file status, file size, and the file data, it also gets the server's system time, verifies the identity of the safe, and checks the security method at Step 558.
  (5) If the user chooses to upload the file as a casual file at Step 560, the server writes the file in the safe's folder and updates the relevant record in the file-info table at Step 562. The server asks the user if more files are updated at Step 564. If the user clicks on "Yes", the server sends the upload page at Step 552. If the user clicks on "No," the server sends File Summaries at Step 566.

(6) If the user's choice at Step 558 is "encrypted file" or "No encryption" at Step 568 and 570, the server determines if the file size exceeds the size limit at Step 576. If yes, the server writes the file in the safe's folder at Step 582, and updates the relevant record in the file_info table at Step 584. Otherwise, the server writes the file in the file_info table at Step 580 and updates file information in the file_info table at Step 584. At the end of updating the file_info table at Step 584, the server asks the user if more files are to be uploaded at Step 564. If the user chooses to upload more files, the server sends the file upload page. Otherwise, it sends File Summaries.

(7) If the user's choice at Step 558 is "Use of safe password," the server retrieves the password from the user_info table and encrypts the file at Step 574 and repeats the following process beginning at Step 576. Its security method is written in the relevant record in the file_info table.

The server assigns a file name by (1) getting the original name or (2) generating a unique file name. If the file has to be written in the safe's folder and if the server uses its original file name, the server must check all files in the safe's folder. If a file name has been used by a file inside the folder, the server prompts the user to change file name, and sends the uploading form again.

4. Considerations in Selecting Encryption Keys

When a user selects encryption method for uploading files, the user has sole responsibility to permanently keep encryption keys. If the keys are lost, the content of lodged files cannot be recovered. For an important file, the user must carefully make a plan to securely keep encryption keys that should be recoverable in the event of loss.

The most difficult issue in this file lodging system is the security method. On the one hand, it must be safe enough so that safe users would not hesitate to store highly confidential files on the system. On the other hand, the security system must provide enough tools that help the owner successfully decrypt the files many years later. The user should be advised to have the sole responsibility to securely keep encryption keys permanently. The safe system may provide help instructions in selecting and securely keeping encryption keys. For example, the user should be provided with useful tips on how to select encryption keys and safe keep them. If a user has important confidential files in the safe, the user should store the encryption keys in one or more security firms by special arrangements. If one or more files are encrypted prior to uploading, sufficient decryption instructions, without disclosing anything that can associate the stored files and the particular safe, should be kept permanently. When a need arises to decrypt a file in the safe, the user can get encryption keys and the decryption instructions from the security firms.

There are several useful guiding rules for selecting encryption keys. When a file is encrypted using keys A and B, the two keys may be kept in two security firms X and Y. The person who places a file in the safe may write instructions of using keys A and B to decrypt the file. The instructions, which must be kept permanently with sufficient security protection, do not have the keys (e.g., the values). The instructions do not expressly tell where the keys are kept, but the user must remember where the two keys are kept. The instructions may serve as a partial reminder of using two keys.

In this arrangement, the employees of the security firms cannot directly access both the keys and instructions. Even if someone has access to the keys (A_number=123456 and B_number=654321), they do not know the purpose of each of the keys, the method of combination, and the detailed use instructions. This information would be viewed as junk.

Another person, who has gained access to the decryption instructions, cannot find the keys. The instructions may contain_ a description of doing something by using a A_number and B_number. The instructions may be very obscured and contain presumptions that are understandable to the creator of the instructions or the people who are close to the creator.

The arrangement for storing encryption keys in the security firm does not completely prevent its employees from knowing the keys. Also, the keys may be intercepted by an unauthorized user. For example, a hacker may be able to get the keys from intercepted correspondences between the user and the security firm. Therefore, it is important that the security firms should not use mail to release the encryption keys, and may release the keys to the user only upon satisfactory approval of the user's identity.

The second methodology is that the user permanently "remembers" encryption keys. By using this methodology, the keys must be numbers and/or words that are easy to remember by the user. Since the keys are never visible, the server encourages the user to write a hint for each of the encryption keys (FIGS. 5A, 5B), which are provided to the user whenever the user wants to download and decrypt the file. The following are some helpful rules for selecting encryption keys.

First, encryption keys should not be based on personal information such as social security number and birth-day directly. Those numbers may be used in combination with other numbers or words.

Second, encryption keys should not be associated with personal subjective preference such as favorable numbers, favorable car model number because subjective preference may change over time. Subjective preferences have been pervasively used as reminders of security questions and may result in disasters in some cases.

Third, encryption keys should not be based upon erasable personal memory and instead they must be ascertainable by examining external evidence. A reminder that "the place John Doe visited in May 1970" may be a bad choice because John Doe would not be able to remember the trip many years later, and there would be nothing left for establishing the place. Similarly, many reminders may be improper such as "the date John Doe went out with the first date" because John Doe may be unable to remember anything about the first date.

Fourth, reminders or hints for the encryption keys should not be understanable to other persons. "The first house on Red Light Street in Baltimore, Md." may be understandable to any person because one can find the house number.

Fifth, the subject matters serving as reminders of encryption keys shall not change over time, or, even if they change, external evidence must be available for establishing the subject matters. Good subjects include house, street number, landmark, and historical major events.

In summary, a good reminder should not be based on personal preference, and subjective feelings. It should not depend upon personal memory unless underlying subject is truly unforgettable. The remainder should not be understandable to any person looking at its face. The subject matter serving as the reminder should not change, or permanent external evidence is available for establishing the subject matter.

A good reminder may be like the "The house in Arizona in 1980" if the person once lived in the Arizona house for several months in 1980 and it is not a permanent residence and there is no other house the person ever lived in Arizona in his life. This reminder does not reveal the connection between the house and the person, and the connection can be established by the person's unforgettable memory from his own living experience. It is highly unlikely that the person forgets this house completely. Even if the person forgets the house address, the person can establish its address by conducting some investigation because it is impossible that all traces concerning the house can be erased from all public records. It is also obvious that a person cannot determine the address of the house from this statement alone and a unrelated person cannot establish this connection.

The third methodology is to use a one-way "chain reminder." The uploading form generated by the system contains two input boxes to which the user may enter two hints respectively. Whenever the user opens the download form to download the same file, the server sends a page showing the two hints to the user. The user may enter "5-31-2006 note" as one of the hints. This name must be unique. Soon after the file is successfully uploaded, the user writes a note titled "5-31-2006 note." This note contains an encryption key without disclosing any information on it's use. It is preferable that the the note includes an obvious statement that the note must be kept permanently and its use is triggered by an external event so that the user will dutifully keep this note permanently.

The server administrators cannot access the file because there is no way for them to have this note. Unrelated people, who encounter the note, do not know the connection between the note and the safe. Many years late, when the person downloads the file, the server prints, "Please enter the encryption key" with a "5-31-2006 note" as a hint. The user then finds the note and the key in the note. The risk for using this methodology is that if the user loses the note, the user will not be unable to access the file. It is also important that if the user dies, an arrangement must be made so that the estate will keep the note permanently.

The note may be so innocent that there is no conceivable possibility for others to understand. For example, the note may contain two headings and two passages whereas the hints may be "heading one from the XYZ note" and "heading two from the XYZ note." The user should not use information contained in public documents as hints because the documents may be available to safe management staff.

5. Files Transmission Security

The entire uploading page, which contains encryption keys, may be encrypted for transmission by using a Secure Sockets Layer ("SSL"), a protocol developed for transmitting private data via the Internet. Since the SSL works as transport layer and is well known prior art, its use is not discussed in all processes where files are uploaded or downloaded. Transport security is widely used in the Internet.

SSL uses a cryptographic system that uses two keys to encrypt data—a public key known to everyone and a private or secret key known only to the recipient of the message. Another protocol for transmitting data securely over the Internet is Secure HTTP (S-HTTP). SSL creates a secure connection between a client and a server over which any amount of data can be sent securely. S-HTTP is designed to transmit individual messages securely and can be used for sending notice.

When SSL is used in uploading and downloading a file, it protects the file and encryption keys in transmission. After the file is uploaded but before the file is saved, the file is encrypted and then is written to on the disk of the server. In retrieving the file, the user sends a request together with the encryption keys. After the file is read from the disk, the system decrypts the file before it is sent to the user. During download, the file in data steam is also encrypted. Therefore, the combination of using SSL and application of encryption to the file in storage makes the system highly secure.

C. File Summaries

After the user logs into a safe on the system, the server presents a default home page for the safe account (FIG. 6A). The default view is the user's safe. If the user clicks "Other User's Safes," the server generates a table showing files from other safes (FIG. 6B) the user has right to access. If the user clicks on "Your Unsecured Drawer", the server generates a table showing casual files (FIG. 6C). Each of the file numbers is a link for opening the File Details page for the file. Each of the files on File Summaries (all three tables) has a "Download" or "Decrypt" link, depending on if a private key was used in encrypting the file when the file was uploaded.

1. Files in "Your Safe"

The "Your Safe" table shows the information of the files the user has uploaded. The column headings have the following meanings:

"File No." means serial numbers generated automatically by the server for files. Preferably each of the file numbers is system-wide unique.

"Description" means a description of each of the files for identification purpose.

"Uploading Date/Time" means the uploading dates and times that the files are uploaded, and they cannot be changed.

"Size (K)" means the sizes of files.

"Security" means the encryption methods used for files. There are at least five security methods used in the system. "Single key" and "two keys" mean that the associated file is encrypted by one private key or two private keys, "Safe Password" means that the associated file is encrypted by the safe's registration password, "Not encrypted" means that the associated file is not encrypted, and "Encrypted file" means that the associated file has been encrypted before it is uploaded into the server.

"Status" indicates the status of the file. "Inactive" means that the file can be read and downloaded only by the file owner and cannot be accessed by other parties. "Active" file can be accessed from both current safe and all authorized safes "Verified" means the status of a file concerning its conditions "V" indicates that the file has been verified as readable upon successful uploading. "UV" means that a file has not been verified and the user may verify it any time later. If a file is found to be unreadable upon uploading, the file is deleted immediately. If a file is found unreadable in a later verification test, the file is marked as "bad".

On the File Summaries table (FIG. 6A), file condition is indicated as "V" or "UV" which is saved in the "verified" field of the record in the file_info table. If a file is uploaded without verifying its readability, the file is marked as "UV" (i.e., unverified). The user can later verify the file by clicking "UV" according to the process shown in FIG. 6F. The user first clicks "UV" for the file at Step 612 to open a verification form at Step 614. The user provides key or keys in the input boxes at Step 616 and submits the form at Step 618. The server, in response, sends a file condition feedback form with Yes and No buttons at Step 640. The server also retrieves the file information such as encryption method and file path (if it is an over-sized file) from the file_info table at Step 620. The server either reads the file from a folder at Step 624 or from the database table at Step 626, decrypts the file using the user-provided keys at Step 628, and sends a file download dialog with two options and an OK button at Steps 630, 632. The user may save the file at Step 634 or open the file at Step 636, and verify the file condition at Step 638. If the user clicks on "Yes" on the file condition feedback form at Step 642, the server marks "V" in the "verified" field of the related record in the file_info table at Step 644. If the user clicks on "No" on the file quality feedback form at Step 646, the server writes "bad"

in the "verified" filed of the related record in the file_info table. Finally, the server updates File Summaries reflecting the verification status of the file at Step 648.

Files can be downloaded from the File Summaries page or the File Download page. Each of the files on the File Summaries table is associated with a link of Decrypt or Download. The files that are encrypted with single key or two keys are associated with Decrypt links while the files that are pre-encrypted or not encrypted are associated with a Download link (FIG. 6A).

Figure 6G:
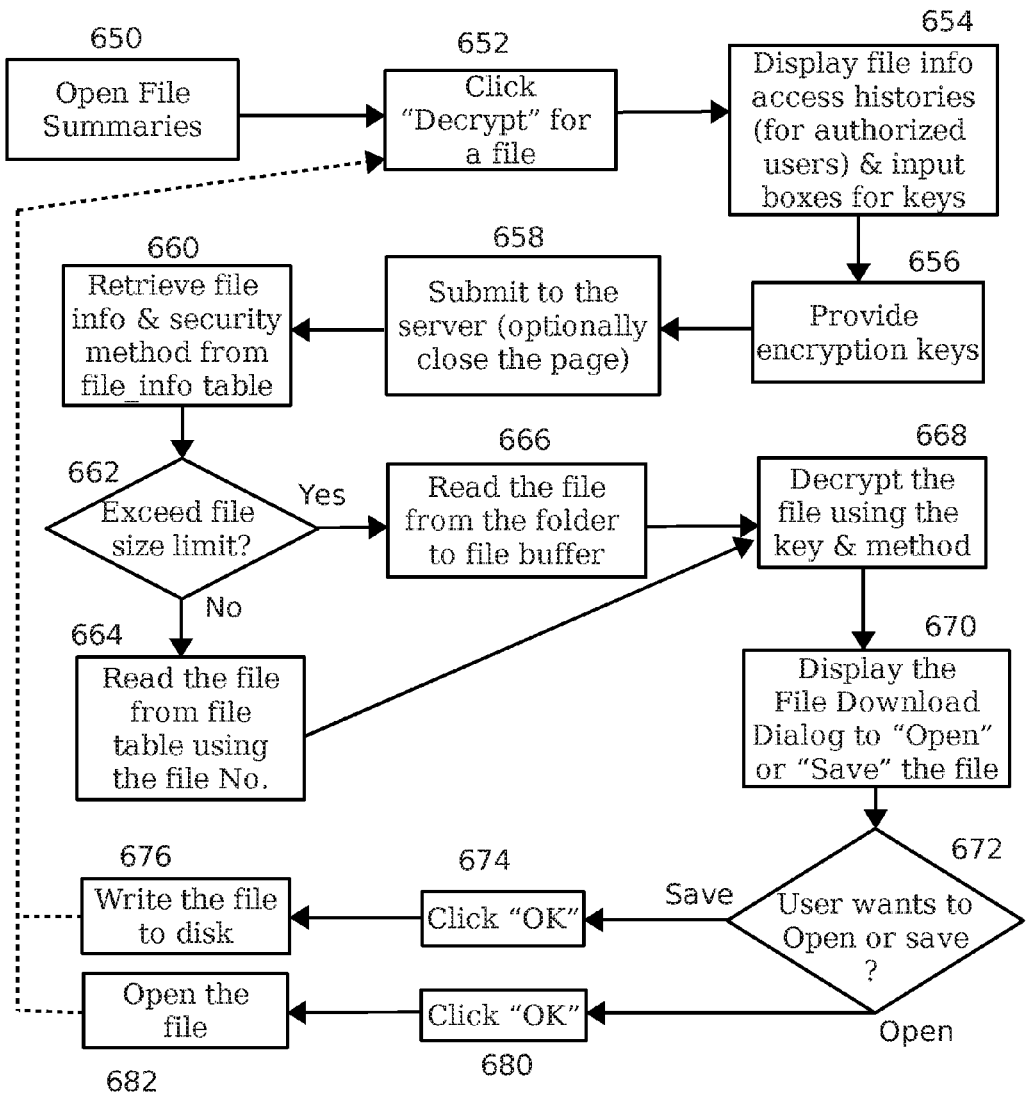
FIG. 6G shows the steps for decrypting and downloading a file.
Figure 6H:
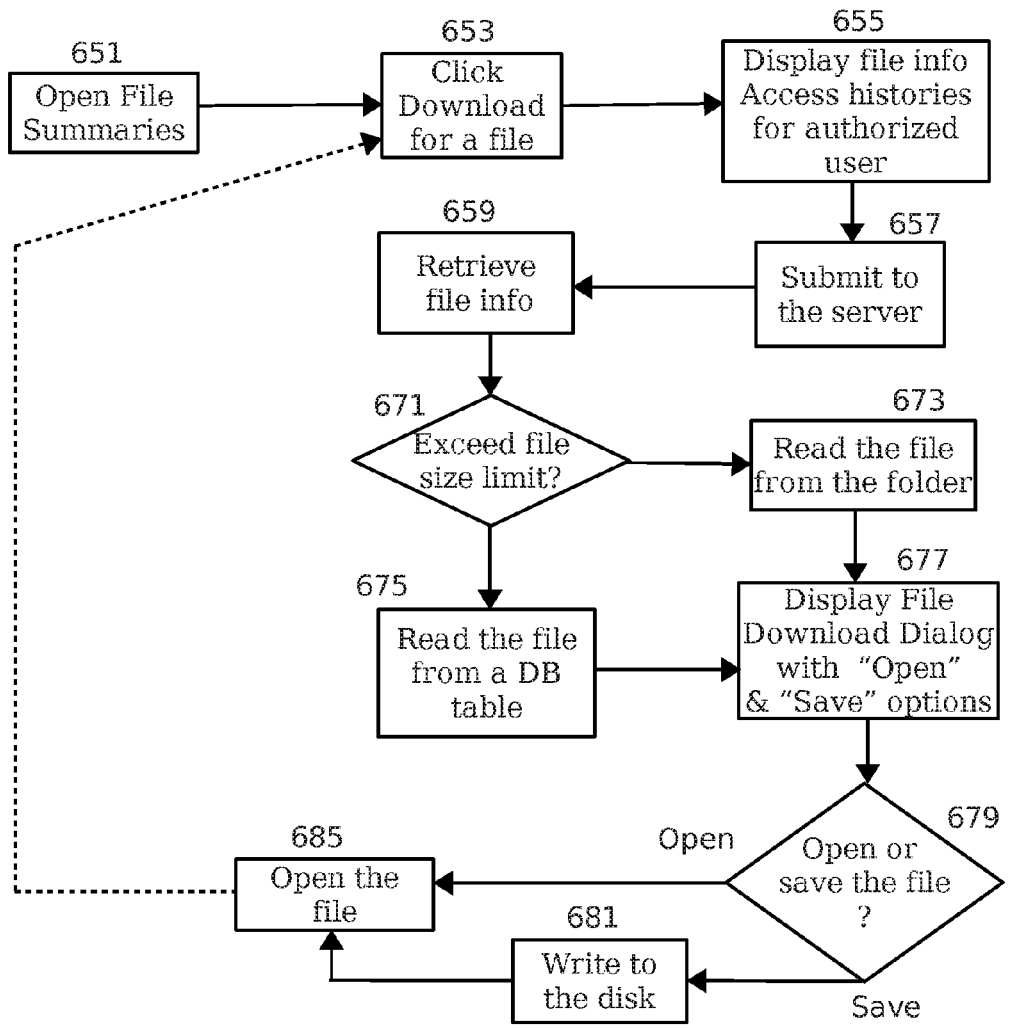
FIG. 6H shows the steps for downloading an unencrypted file.

The process of decrypting and downloading a file is shown in FIGS. 6G, 6H.

When a user clicks on "Decrypt" for a file at Step 652. The server generates a form with input boxes for downloading the file at Step 654. If the file is encrypted by one encryption key, the user enters one key. If the file is encrypted with two keys, the form has input boxes for two keys. The user provides encryption keys in the input boxes at Step 656 and submits the form to the server at Step 658. After receiving the form, the server retrieves file information including security method at Step 660. If the file size exceeds the size limit, the server reads the file from the safe's folder to a file buffer at Step 666; otherwise, it reads the file from the file_info table at Step 664. The server decrypts the file using the user-provided keys and the same encryption method which has been used to encrypt the file at Step 668, and then sends to the client a file download dialog (with option to save and open file and an OK button) at Step 670. If the user chooses to save the file at Step 672 and clicks on "OK" at Step 674, the client computer saves the file in disk at Step 676. If the user chooses to open the file at Step 672, and clicks "OK" at Step 680, the client computer displays the file for the user at Step 682. The user may decrypt another file at Step 652.

If the file is not encrypted, the file is downloaded without decryption. The process is shown in FIG. 6H. When a user clicks "Download" for a file at Step 653, the server generates a page with a submission button for downloading the file at Step 655. The user submits the form to the server at Step 657. After receiving the submitted form, the server retrieves file information at Step 659. If the file size exceeds the size limit, the server reads the file from the safe's folder to a file buffer at Step 673; otherwise, it reads the file from the file_info table at Step 675. The server sends a file download dialog at Step 677. If the user chooses to save the file at Step 679, the client computer saves the downloaded file in the local disk at Step 681. If the user chooses to open the file at Step 679, the client computer displays the downloaded file for the user at Step 685.

If the security method is "Safe Password," the file is encrypted by the safe's registration password as encryption key. This key may not be changed and is permanently saved for decryption. However, the password for the safe account may be changed from time to time and this password is saved in a different set of fields of the database table "user_info."

Two layers of encryption may be achieved by using the pre-encryption feature. For a file has been encrypted, the user may encrypt the file again using any of the available methods such as safe-password, single-key and two-key methods. A combination method can provide the highest security protection to the file and may be particularly useful in keeping highly confidential files that are attached with a large stake.

When the file is encrypted before it is uploaded on the system, it is impossible for any of the server administrators to access it. Encryption also imposes a barrier to unauthorized access. However, due to the use of multiple encryption processes, there is a risk that the user eventually forgets one or more keys or encryption algorithms for decrypting the file. In this case, it is highly desirable that multiple keys and decryption instructions are stored in one or more security firms without disclosing their uses.

The information used to generate the "Your Safe" table is stored in the database table "file_info" as follows:
  safe_name varchar(50)
  file_no int unsigned auto increment not null
  file_description varchar(100)
  file_uploading_time timestamp default CURRENT_TIMESTAMP
  file_size int
  file_security varchar(50)
  key_hint varchar(200)
  key_hint2 varchar(200)
  file_status varchar(10)
  file_verified varchar(2) default
  file_path varchar(100)
  file_content MEDIUMBLOB
  file_index varchar(1) default File_path holds a file path when the file is stored in the safe's folder if the file is too large to be stored in the database table. The files of suitable sizes are stored in the field of "file_content." In addition, the "file_path" field may also contain file type, which is required for file download. The data is retrieved from the table in creating file summaries. One example of SQL statements for retrieving the data would be as follows:
  select file_no, file_description, DATE_FORMAT (file_uploading_time, '%m/%d/%Y %T'), file_size, file_security, file_status from file_info where file_owner='account' and file_status<>'Delete' order by file_no.

2. Files the User has Right to Access

The web table associated with "Other Users' Safe" shows the files that the user is authorized to access. The owner column shows the name of the file's owner. Other columns hold the same information as that in the "Your Safe" table. The safe owner is not always allowed to open the files from other users' safes. If the safe owner does not have required keys for decrypting the files, the owner cannot open them. In addition, the table does not show file status and verification status.

The table "Other Users' Safe" is generated from the information in the database table "file_info" discussed above. Access control in one version of the embodiment is realized by using the following database table "grant_access:"
  safe_name varchar(50)
  file_no int unsigned not null
  grant_id int unsigned not null auto increment
  recipient_safe varchar(50) NOT NULL
  recipient_no bigint unsigned
  grant_time timestamp default CURRENT_TIMESTAMP
  access_type varchar(5)
  access_number tinyint
  expiration_time timestamp NOT NULL
  expired varchar(1) default 'N'
  used_number tinyint default 0

When right to access to a file is granted to another person's safe, a record is created, which includes the values for the safe_name, file_no, recipient_safe, and recipient_no. Additional fields are used for controlling access. The "grant_time" contains the day and time that the right of access is granted; "access_type" holds information that includes (1) the right to view the file information only, (2) the right to download the file and (3) the right to download and decrypt the file. "Access_number" is the maximum number of accesses that the recipient may have before the expiration date. Viewing a file summary is not counted as an access if the right of access is to download the file. The value in the "status" field of the record indicates if the right of access has expired, revoked, or is still valid. "used_number" is the number of accesses the recipient safe owner has used. "expiration_time" stores the day and time at which a granted access right expires regardless of the actual number accesses the user has made. "expired" holds a "Y" or "N" as an indicator if access right has expired. Each time when an access to a file is made, the server checks the system time and compares the time with the value in the expiration_time to determine if access right has expired and write the status accordingly. If this value is Y (e.g., expired), the server will stop further actions upon checking this value in response to a file access request.

Optionally, access right for a file may be set as "expired" if the number of used accesses has reached the limit. In this case, use of the "expired" field as a status indicator is convenient.

When a "grant_access" record is created, the access status is set as valid. Each time when an access request is made by the second user, the server first checks the value of "expired" to determine if the right of access has expired. If it is, the server denies the access request. If the value indicates the grant is still valid, the server then determines if the right of access has expired after the last access. If the time has not expired, the server grants access to the file. After an access is made successfully, the server then determines if the number of access has been used up. In doing so, the server counts all prior accesses from the grant time and computes the number of the remaining accesses. The server may just add one to the "access_count" after reach access. At the end of each access, the server then compares the number of accesses granted and the number of accesses used. If they are equal, the server deletes the grant record and save it as an expired grant. If the access period has expired or if the access count reaches the access number, the server marks the value of the "expired" field as expired. Otherwise, it keeps the "N" value.

The data in the "Files You Have Right To Access" table is stored in the "user_info" and "grant_access" tables. An example SQL statement for retrieving information for constructing "Files You Have Right To Access" table would be as follows:

select a.file_no, a.file_description, a.file_size, a.file_security, DATE_FORMAT(a.file_uploading_time, '% m/% d/% Y % T'), b.recipient_safe from file_info a, grant_access b where a.file_status< >'Delete' and a.file_no=b.file_no and b.recipient_safe='safe account' order by a.file_no.

3. Casual Files

On the home page of a safe account, a user may also have an icon or link from which the user can open page for viewing causal files. Casual files may be stored in a folder just like conventional safe. The folder is provided for storage of the files that are not confidential and that do not require the proof of creation or uploading dates.

The icon or link for casual files is on the "File Summaries" page. Upon clicking on "Your unsecured drawer", the server sends a page to display all of the casual files. While the casual files are stored in the safe's folder physically, they may be displayed in different ways. They may be displayed in a folder-tree view or a table view. Regardless of the method of display, the server must find the folder, get files information (such as folder structure, file names, and files sizes), and use the information for displaying the folder tree on the browser in a suitable language such as JavaScript. Under a browser supporting JavaScript, the file tree can be displayed. In the alternative, casual files may be entered on a table just like the table for the lodged files in "Your Safe." One example is shown in FIG. 6C.

Regardless of display method, the server needs to track the file paths, file types, file names and file sizes so that the files can be downloaded. There may be various forms of implementations, but the art is well known and pervasively used by various online systems.

Casual files are different from lodged files in several aspects. First, casual files are not tracked by using system-wide file numbers. Second, they are not encrypted. Third, casual files can be deleted without trace and no permanent record is preserved. Thus, it is impossible to prove the substance in a later time. Regardless of different implementations, casual files are essentially handled in the same way as the lodged files in many other aspects.

In one version embodiment of the present invention, casual files are saved in a common root folder, and file names are generated from placing safe numbers in front of random numbers. If a need arises for assigning plural folders, plural folders may be assigned to safe accounts. Plural folders may be allocated on multiple partitions. For example, if ten partitions of storage space are available for holding 1,000,000 accounts, 100,000 accounts may be allocated on each of the ten partitions. While many safes may share a folder for storing casual files, it is preferred that each safe has a personalized folder.

Proper candidates for storage as casual files include public licenses, marriage licenses, professional licenses, governmental documents, and files belonging to public domains. The general rule is that any file that may have intellectual property right such as patent, copyright, and trade secrets should not be stored in casual file folders. Wills and trusts, invention disclosures, program code, creative writings, video files, audio files, and the works whose creation time and substance may be important should be placed as lodged files. Also, the files, which may contain important information on proving the times and substances of events or acts, should be stored as lodged files. It may be difficult to make this determination at the time of uploading a file. An undated notice sent to another party may be a critical element required to impose liability on the party even though the notice alone may be innocent.

A user can delete any file by calling the page in FIG. 7C, but cannot delete file of others the user has right view, download or decrypt. Deleted files are not listed on the "File Summaries" table. However, file histories for deleted files are maintained for a period of time for safety reasons. The time may be the length of the longest statute of limitations for contract claims. It is preferable that the user may have some options to view the file histories of deleted files. The information to be viewed by safe owner may include file number, update date, deletion date, file description, and a series of access history data such as access date, access type, and access party.

D. File Details Under File Summaries

In the "Files in Your Own Safe" page, the user can open the "File Details" page by clicking any file number (FIG. 7A) or an optional "details" link.

At the top of the File Details page shown is the basic information such as safe name, safe number, safe owner, and access code. This page contains the details of the file that the user has selected. File details include file number, uploading date and time, description, encryption method, file size, verification status (not shown in FIG. 7A), and file status together with several operation buttons on the left. It also shows the safes and access codes of the safes that have right to access the file.

On the "File Details" page (FIG. 7A), the user can use the left menus to change the file status (FIG. 7B), delete the file (FIG. 7C), change access right (FIGS. 7D-7G), order electronic authenticity certificates (FIGS. 7H-7J), order hardcopy authenticity certificates (FIGS. 7K-7M), and view file access histories. Each of the operations works only on the file associated with the file number.

1. Change file status

The user can open the page for changing file status by clicking "Change Status" (FIG. 7B). The default value of the file's status is "active" and the user can change it to "Inactive" or "Global." When the file is inactive, it can be accessed only by the safe owner while an active file can be accessed from both the owner safe and authorized safes. To change file status, the user just selects a status option, and hits the "Enter" key or clicks the "Change" button (FIG. 7B). In response, if the status is changed successfully, the server returns a success message. Otherwise, it returns an error message.

File status is stored in the field "file_status" of the database table "file_info." One of examples of the SQL statements for implementing the status would be: update file_info set file_status='the selected status value' where file_no='the file number the user selected.'

2. Delete files

Figure 7N:
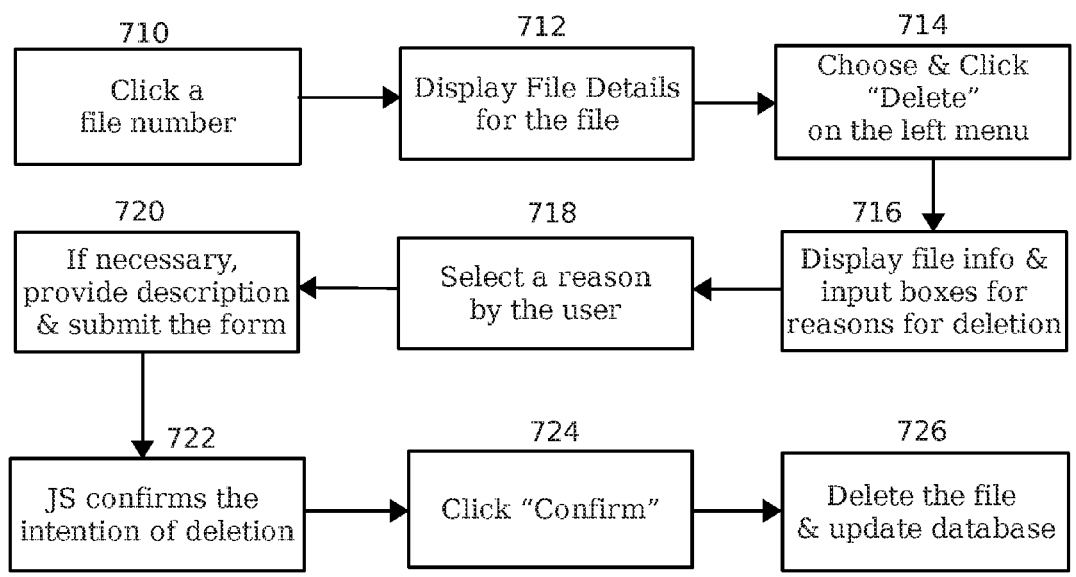
FIG. 7N shows the steps for deleting a file.
Figure 70:
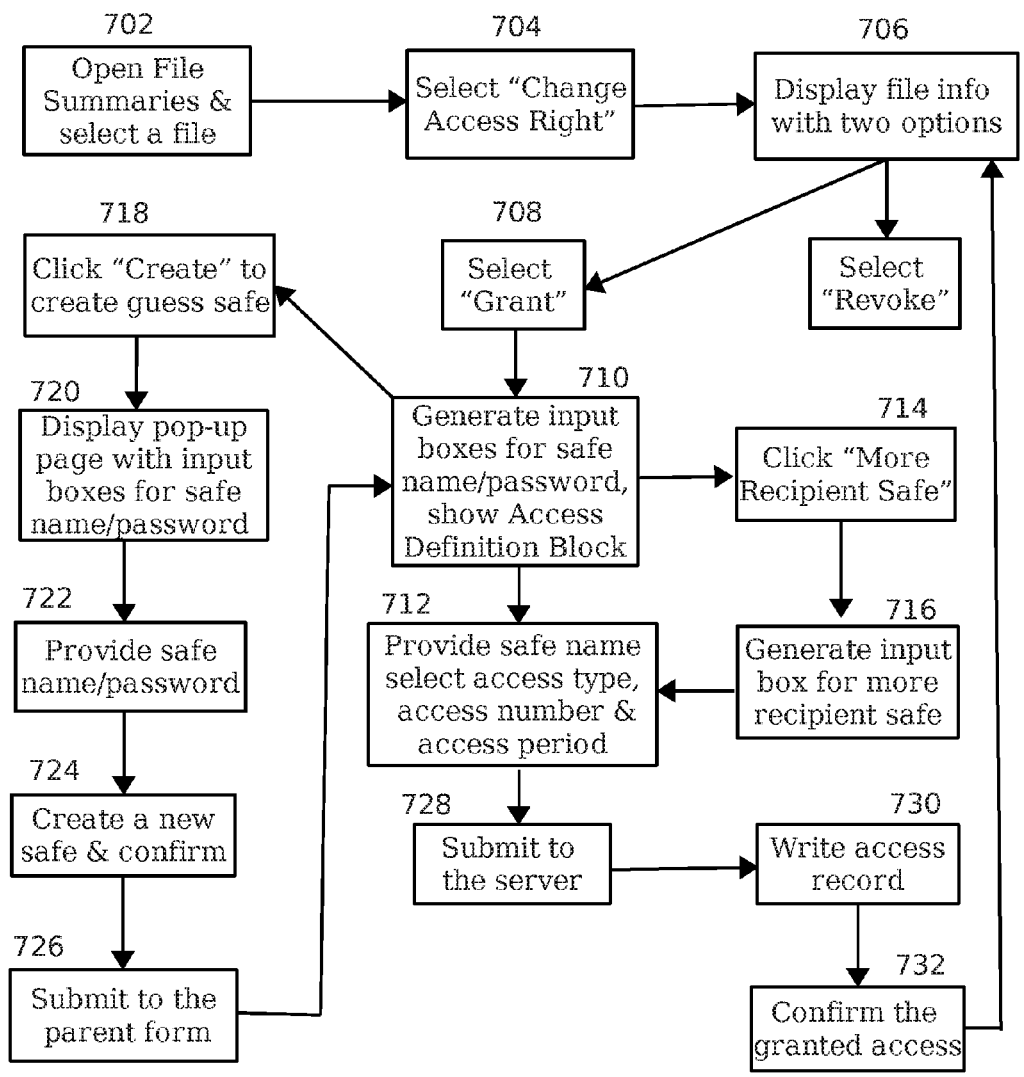

On the "File Details" page, when the user clicks "Delete File" on the left, the server shows the page for deleting the file (FIG. 7C). The process of deleting a file is shown in FIG. 7N.

On the File Summaries page, the user selects a file and clicks a file number at Step 710. The server sends the page of showing file details for the file at Step 712 and the user clicks "Delete" on the left menu list at Step 714. In response, the server sends a page with multiple choices and an input box for entering the reason for deletion at Step 718. The user selects a reason from the multiple choices or types in a reason in the input box, and submits the filled form at Step 720. The browser displays a dialog with a "Yes" button for confirming that the file will be deleted at Step 722. Upon clicking on "Yes" at Step 724, the server deletes the file and file information, and writes a record in the table for deleted file.

If the file is deleted successfully, the server returns the message that "The file has been deleted successfully!" If the server encounters an error, it returns an error message. Once the file is deleted, it cannot be downloaded. When a file is deleted, the file is permanently deleted and is no longer available for download. The file may be recoverable only from backup media under special circumstances.

When a file is deleted, some important information such as basic file information and past access histories are stored in the database table "deleted files" and the table used in one version embodiment may have the following fields: safe_name varchar(20), file_no int unsigned, description varchar(100) deletion_id int, delete_time timestamp NOT NULL default CURRENT_TIMESTAMP, file_delete_reason varchar(100), file_access_summary varchar(500).

When a file is deleted, the deletion time and the reason for deletion are stored in a record in the table "deleted_files." The server then copies the uploading time and file description from the "file_info" table and access times and access safes from the table "access histories," and writes them in the "file_access_summary" field. The format may be a series of delimited data pairs (access date, access party: access date, access party).

3. Grant and Revoke Access Right

On the "File Details" page, the user can grant the right of access to a safe of a second user by clicking "Change Access Right" (FIGS. 7D-7G).

"Type Of Access" has the values for three kinds of rights of access. One of the options is to "View Summary", which means the authorized person can read the summary information about the file only. The second option is to "View Summary and Download" the file. The party who has been granted this access right can read summary information and download the file. Another option is to "View Summary, Download & Decrypt File." The user with this right can read the basic information about the file, download it directly, and decrypt it on-the-fly. It is preferable that the server confirms that the user understands the scope of access from reading the confirmation page when the user submits the page.

"Access Number Limit" is used to limit the total number of complete access. If access type is to view file summary and download file, viewing summary and downloading the file is counted as one access. Viewing the file summary alone is not be counted as a complete access. The default value is that no limit and the user can select or type in a number.

"Access Period Limit" is the time period that the authorized user can access the file. The default value may be 30 days, but the user can modify this value by entering any access period with a proper unit. If a second user is granted the right to download the file twice in 30 days, the user must exercise this right before the expiration of the 30-day period. The right expires when the number of access has reached the limit.

The right of access is implemented in a grant_access table. The general principle is that each of the record contains complete information for defining a unique access right. The record in the grant_access table is referred to as an "access record" or "grant" in this disclosure. The implementation must be able to handle active grants, expired grants and revoked grants.

There are two ways to implement this feature. In one version of the preferred embodiment of the present invention, only one grant table is declared and used for tracking all access rights. In this implementation, a status word is used for distinguishing active grants, expired grants and revoked grants. For any given file and given recipient safe, only one active grant is allowed. If the right of access to a file granted to a recipient is changed, the server marks the original grant as revoked and writes a new grant as active grant. If the user wants to grant the right of access to a file to a second user when a valid grant exists for the same recipient user and the same file number, the server first marks the existing grant as "revoked." It then creates a new record for the new grant for the same file and the same recipient. In this implementation, database records for revoked and expired grants will accumulate quickly and a large number of such records affect the speed at which the files are retrieved in recipient safes. This implementation preserves the complete grant history of each file.

In the preferred embodiment, two separate tables are used. One table is used to store all active grants while the other table is used to store historical grants (all expired and revoked grants). When a grant is revoked, it is deleted from the grant_access table and written in the revoked_grants table. Whenever a grant is updated, the server moves the record from the active grant_access table to the revoked_grants table.

If the server revokes and grants the access right successfully, it responds with the message "The access right is updated successfully!" Otherwise, the server returns the error message that "The safe name is incorrect." or "Access code is incorrect."

A large number of grant records might exist for the same file and same safe. Among all grants, only the last one can grant right. All previous grant records are marked as "revoked" in the "status" field, or kept in the revoked_grants table. Even the last grant record may become invalid as a result of expiration of time and the use up of the granted access number. As a result, the file is not displayed in the recipient safe. For easy identifications of grants a unique "grant_id" is used for tracking the identifications of all grants. Each of the grant records is assigned with a unique id. There are two methods for tracking grant ID. Whenever a new grant record is to be created, the server gets the largest value from "grant_id", adds one, and writes the value in the "grant_id" of the new grant record. In the alternative, the grant-id field can be declared as an integer with automatic increment. This may impose a restriction on system administrators because it disallows them from manually assigning a grant number.

The "Change Access Right" function in one version embodiment is implemented in the "grant_access" table:
   safe_name varchar(20)
   file_no int unsigned
   grant_id tinyint unsigned
   status varchar(10)
   recipient_safe varchar(20) NOT NULL
   recipient_no bigint unsigned
   grant_time timestamp default CURRENT_TIME STAMP
   access_type varchar(1)
   access_number tinyint
   access_count int (optional)
   expiration_time timestamp NOT NULL When right of access is granted, a record is created for a given file number and the given recipient safe name in the "recipient_safe" field. Access code is optional because it is used only for verification purpose in granting or revoking. The purpose is to prevent a typing error of the user. The server compares the user-provided access code against the value in the "user_info" table to determine if the recipient safe name is correct. Access number to be granted is written in the access_number field. The access_count field stores the actual number of access the recipient has made. When this number is equal to the access number, the access right expires and the access record is moved to the archival table. The time of creating an access right is saved in the "grant_time" field. The value for access period is converted to expiration time, and is written in the "expiration_time" field in the access record. Expiration time is computed from grant time and access period.

If the user wants to grant additional right for the same file and same user, the server creates a new access record. There are two ways of implementing the method of updating right of access for any file. In the first method, all grant records are stored in one single table. When a record is revoked or expired, the value in the status field is assigned with a special value indicating its invalid status. The "status" field in the old grant record is marked as "revoked" or "expired."

If two separate tables are used for managing and updating access rights, the two tables may be different. When a request is made to update a right of access for the same file and same recipient safe, the server copies all material information from the old grant record and saves it in a table holding revoked and expired access records for record-keeping purpose. The revoked_grants table contains data such as revoke_id, revoke_time, grant_time, revoke_reason, and grant_info (text) that holds past grant histories (e.g., recipient_no, grant_time, access_type, access_number, and expiration_time). Whenever right of access is updated, one new grant record is created in the grant table and one revoked grant record is created in the revoked_grants table.

An example SQL statement for revoking access right would be: delete from grant_access where file_no='the file number the user selected' and recipient_safe='the account of the user to be revoked'.

An example SQL statement for granting new access right would be as follows:
   insert into grant_access(file_no, safe-name, recipient_safe, grant_time, access_type, access_number, access_period) values ('the file number the user selected', 'the safe name of the file owner', 'the safe name of the second user', 'the current time of the server', 'the selected access type', 'the selected access number', 'the selected access period');

Before an old access record is deleted, the server may extract all substance from the old access record and write the substance in the "revoked_grants" table for permanent record. The table structure of the table for revoked access grants records is flexible as long as the table can effectively use storage space. The server then deletes the old access record.

The process of granting right of access to a file is shown in FIG. 7O and the related web pages are shown in FIGS. 7D-7G. The user first opens File Summaries and selects a file at Step 702. The server sends a File Details page for the file together with the menu "Change Access right" on the left (FIG. 7A). The user clicks "Change Access right" at Step 704. The server sends a page showing file information with two options of "Grant" and "Revoke" and a "Continue" button. The user clicks "Grant" and presses "Continue" at Step 708. The server updates the page by including a recipient safe name block consisting of two input boxes for Safe Name and Access code and an access definition block at Step 710. The access definition block allows the user to define access type, access number and access period (The block below Step 3 in FIG. 7E is same as the block below Step 3 in FIG. 9B). If the user wants to grant right of access to plural recipient safes, the user clicks "More Recipient Safe" at Step 714, and the web page generates one more recipient safe name block consisting of two input boxes. The user may remove a recipient safe name block (except the first one) by clicking "Fewer Recipient Safe." The function of adding or removing a recipient name block is realized by running an embodied JavaScript program. The user then provides safe names and access codes in the input boxes at Step 712 and submits the form to the server at Step 728.

Upon submission at Step 728, the server gets the values of the safe name and access code that the user has typed in and compares them with the values of safe names and access code in records in the database table "user_info." If a record is found, the safe name that the user has provided is assumed to be right. Otherwise, the server responds with an error message like "Safe name is incorrect" or "Access code is incorrect."

After the server finds the safe, the server checks if a prior grant exists for the same safe and the same file. If yes, the server deletes the old grant record from the active grant table and writes a copy of the old grant in the database table for revoked and expired grants. The server then writes the new grant in the active grant table. The server responds with a message that right of access has been granted or updated depending upon whether a prior grant exists for the same file and same safe. The server processes grant on the basis of the recipient safe. When right of access is granted to multiple safes, the grant may be a new grant for some safes but an updated grant for other safes. Plural messages may be returned for each of the recipient safes.

When the server grants the right of access to a file, it creates a record for the selected file number in the database table "grant_access." The recipient safe name is written in the recipient_safe field in the table. Upon successful grant, the server returns the message "The right is granted successfully!"

If an intended recipient does not have a safe on the system, the user may create one for the recipient by clicking "CREATE" next to safe name caption in the recipient safe name block (See FIG. 7E) at Step 718. In response, the server generates a pop-up page for creating a guest safe at Step 720. The user then provides proposed safe name and tentative password, and optional email address at Step 722. Upon pressing the "Create" button, the server will verify if the proposed name has been used. If the name has been used, the server responds with a message. Otherwise, the server responds a with pop-up window containing a confirmation message together with the safe name and a system-generated access code at Step 724. The user "submits" the pop-up form at Step 726 to the parent form at Step 710, and the access code value will be copied to the input box for access code in the originating recipient safe name block at Step 710. After a guest safe is created upon submission at Step 728, the server then grants access right to the newly created safe.

If the user knows the safe name but does not know its access code, the user can click "FIND" next to the access code in the recipient safe block (see a web view in FIG. 7E). In response, the server generates a pop-up form containing an input box for searching safe name in the safe account database. The pop-up form may be filled with a safe name from the parent page or accept user inputted name as a search key. The user then starts a search by clicking on "Search" on the pop-up form. In response, the server sends a page to display the safe name, the access code, the owner's name, and optional information such as email address and phone number. If the safe is an intended recipient, the user submits the pop-up form to the parent form, and writes the found access code in the access code box in the recipient safe name block. This process is similar to what is discussed in FIG. 7P.

If right of access to a file is granted to the same recipient, the server first retrieves the existing access record, extracts substance from the record, and writes the substance in the archival table. It then deletes the existing access record and writes a new access record containing the user-defined criteria such as access type, number of access and duration of access.

Figure 7P:
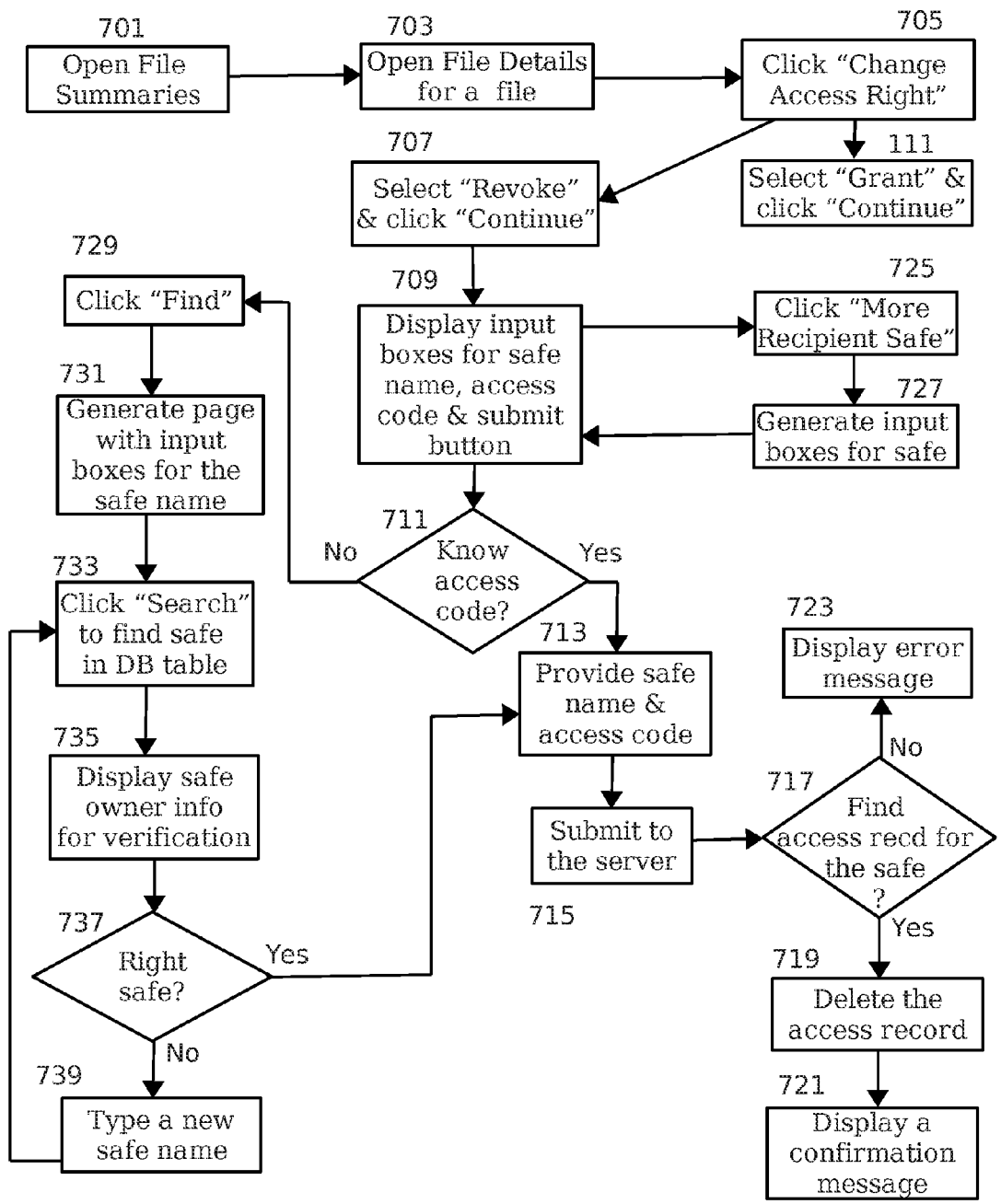
FIG. 7P shows the steps for revoking right of access for a single file.

A user can revoke right of access to the user's safe any time by the process shown in FIG. 7P.

The user opens File Summaries at Step 701, and clicks a file number at Step 703. In response, the server opens File Details for the selected file, and the user then clicks "Change Access Right" (the menu is shown in FIG. 7A). In response, the server opens "Change Access Right" (the page is shown in FIG. 7D) with two options "Grant" or "Revoke" at Step 705. The user selects "Revoke" at Step 707. If the user knows the access code, the user types in recipient safe name and access code at Step 713, and clicks the "Revoke" button. At Step 717, the server verifies the existence of the safe name, and finds the old access record. This step may be broken down into many back-end steps. The server first checks the safe name and access code to determine if the safe name is correct. The server gets the values for the safe name and the access code that the user has typed, and searches for a record from the database table "user_info." If a record can be found, it means that the safe name is correct. The server then determines if a prior grant exists at Step 717. If it finds a valid grant for the same file and same recipient safe, the server retrieves the old access record, reconstructs the data for writing in the archival table, and creates a record in the "revoked_grants" table. It then deletes the old access record at Step 719.

If the user does not know the access code of the recipient safe, the user can click "FIND" next to the access code in the recipient safe block at Step 729. In response, the server generates a pop-up form containing an input box for searching a safe name in the safe account database at Step 731. The pop-up form may be filled with the safe name on the parent page or accept a user-inputted name as a search key. The user then starts a search by clicking "Search" on the pop-up form at Step 733. In response, the server sends a page to display the safe name, its access code, its owner's name, and optional information such as email address and phone number at Step 735. If the safe is an intended safe, the user submits the pop-up form to the parent form, and writes the found access code in the access code box in the recipient safe name block at Step 737.

4. View Access Histories

By using this option, the user can view access histories for a file respective to all parties. This page is opened by clicking "View Access Histories" on FIG. 7A. This table shows the actual access parties, including safe_names and party full names. Each time when a file is accessed by a party, a record is generated containing access_no, file_no, safe_name, access_id, access_date, access_safe, and full contact information and phone number of the accessing party, and action (view, decrypt and download the file). The database table "file_info" may contain an optional field "access_total" for storing the total access number for the file. After each successful access to the file, this number increases its value by one unit. Therefore, the server immediately knows the total access number in the file's lifetime.

5. Order authenticity certificates

Figure 8:
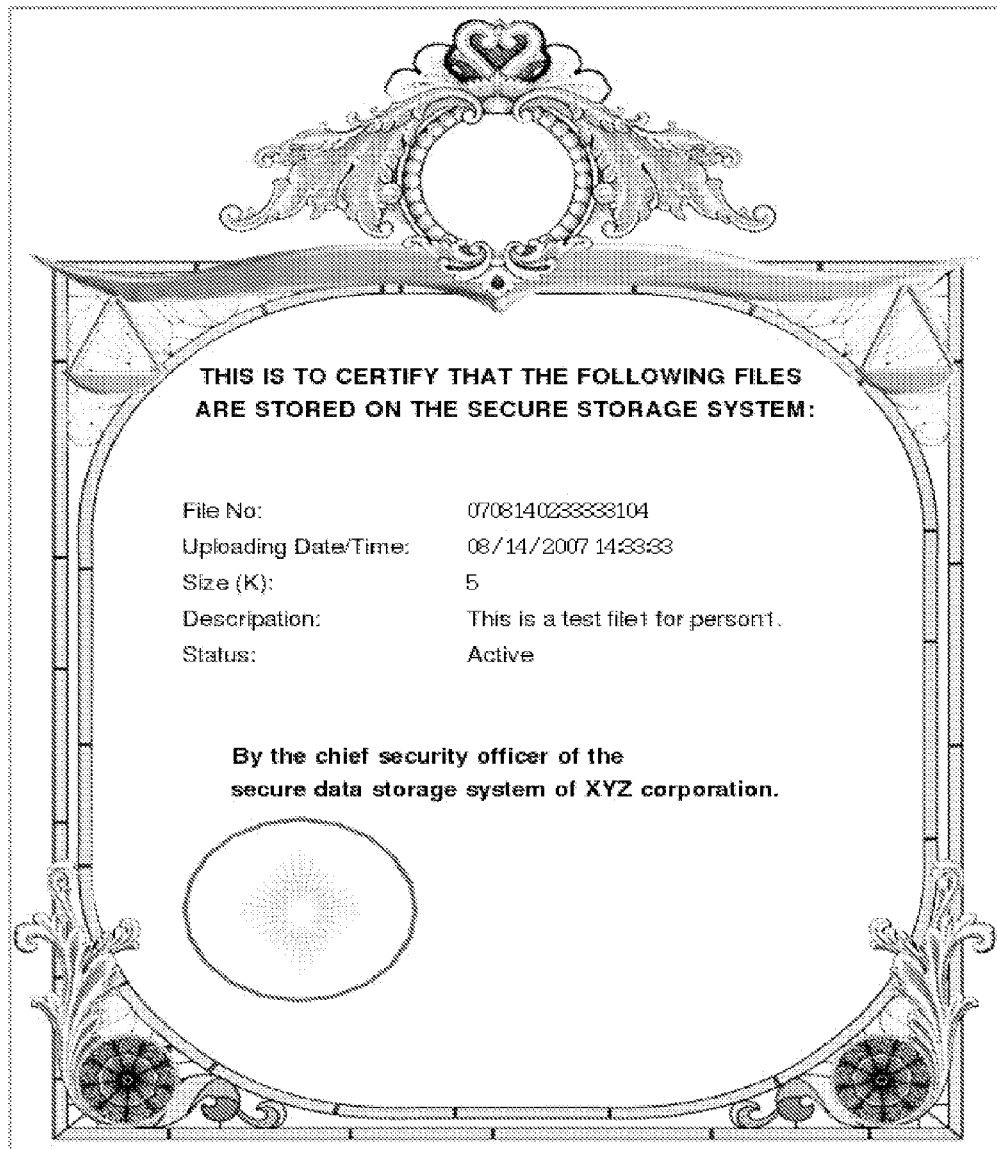
FIG. 8 shows an example authenticity certificate.

By clicking "Order Certificate" on the left of the "File Details" page (FIG. 7A), the server opens the page for ordering authenticity certificate for a single file (FIG. 7H). The user may request issuing three kinds of authenticity certificates for each of the files in the "File Summaries" page. The details for ordering a certificate are similar to the pages shown in FIG. 10A-10C except that the user can order an certificate for only one file a time while the pages in FIGS. 10A-10C allow user to order a certificate for multiple files to be certified. One sample of certificates is shown in FIG. 8.

The user can also order a hard-copy authenticity certificate by using the pages in FIGS. 7K-7M. The details for ordering a hard-copy certificate are similar to the process shown in FIGS. 10C-10D except that the user can order a certificate only for one file.

E. Safe Account Management

By clicking on the menu "Account" on the navigation bar, the server sends a page that allows the user to update the information for the safe account.

Figure 4B:
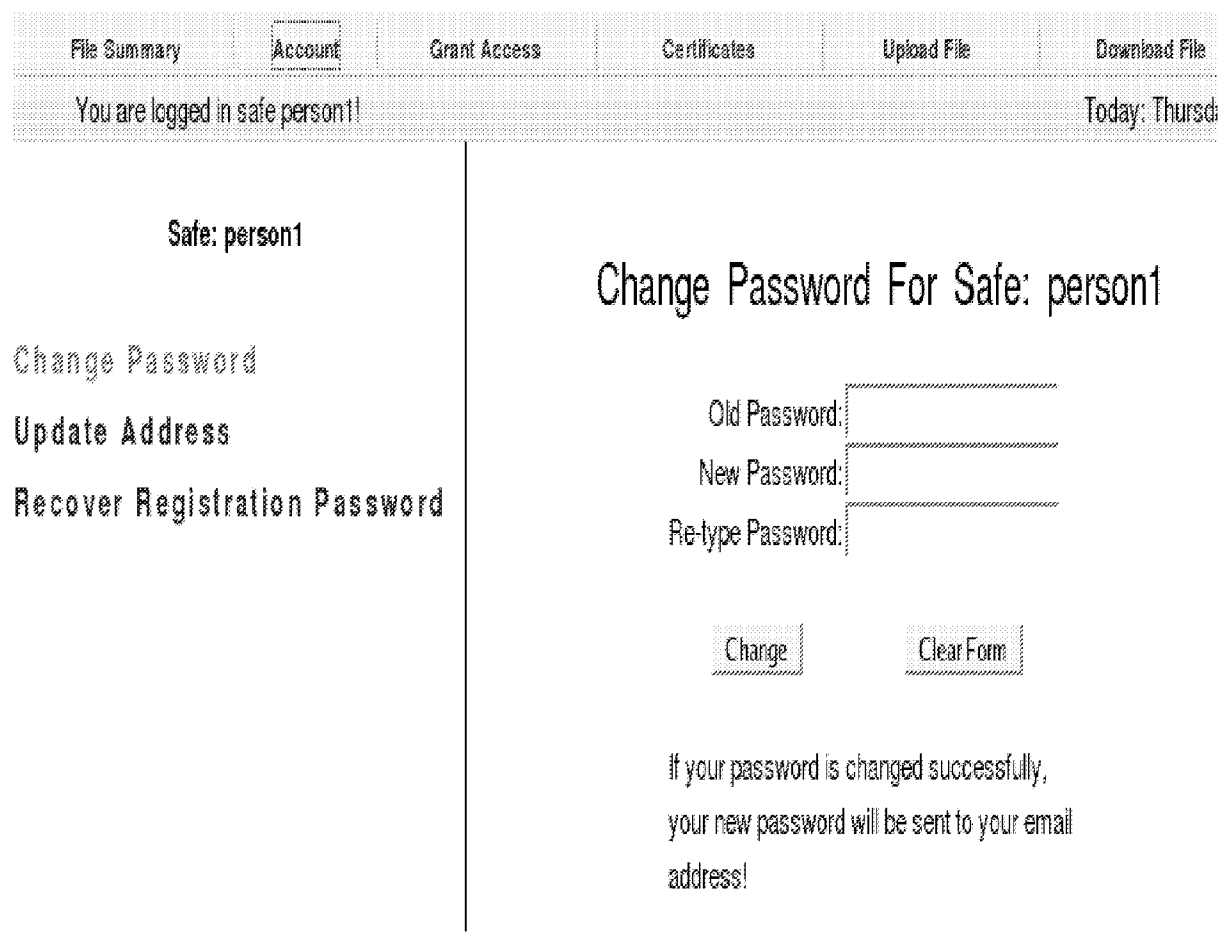

Upon clicking "Change Password" on the account page, the server opens the page for changing safe password (FIG. 4B). The user can change safe password by typing in the old password and a new password in duplicate, and hits the "Enter" key or click the "Change" button. In response, the server returns the message like "Password is changed successfully" and may optionally inform the user of recent change in password (without telling the new password) by email. If the data the user provides is invalid or the server encounters an error, the server sends a page to display an error message that "Old password is incorrect!" or "New password is invalid."

The password information is saved on the "password" field of the database table "user_info." One example of the SQL statements for implementing the change-password function would be: update user_info set password='Encrypt.decryption(new password)', where safe_name='the user safe name'.

This page also allows the user to change address by clicking on "Update Address" (FIG. 4C). On this page, all the data input boxes are populated with the data the user previously entered in the database table "user_info" except password. However, the user can change any of the data and have it saved. To change any data in the address, the user deletes existing data such as street address or phone number, types in updated data, and hits the "Enter" key or clicks the "Update" button. In response, if the server finds no error, it updates the address successfully with a confirmation message that "Address is updated successfully!" Otherwise, the server returns an error message that "You are required to provide data for street address!"

In one version embodiment, "Update Address" is implemented by using the following database table user info:
  safe_name varchar(20)
  safe_no bigint unsigned
  access_code int
  prefix varchar(10)
  firstname varchar(20)
  lastname varchar(20)
  title varchar(4)
  address varchar(50)
  city varchar(20)
  state varchar(2)
  zip varchar(5)
  country varchar(20)
  phone varchar(12)
  email varchar(50)
  activated varchar(1) default 'Y'
  create_date timestamp NOT NULL default CURRENT_TIMESTAMP on update CURRENT_TIMESTAMP
  login_time timestamp NULL
  password varchar(20) NOT NULL
  question varchar(100)
  answer varchar(100)
  regst_password varchar(20) NOT NULL,
  regst_question varchar(100)
  regst_answer varchar(100)

The "Activated" field holds indicator that the safe account is inactive before the account is verified. One of the example SQL statements for retrieving the address would be: select email, prefix, firstname, lastname, title, address, city, state, zip, country, phone from user_info where safe_name='the user safe name'.

One of the example SQL statements for implementing the "Update Address" function would be: update user_info set email='email', access_code='access code', firstname='firstname', lastname='lastname', title='title', address='address', city='city', state='state', zip='zip', phone='phone' where safe_name='safe name' (assuming access code is implemented in an independent field).

The user may also recover forgotten password by clicking "Recover Password" on the page and providing necessary data (FIGS. 3A, 3B). The server gets the value for the safe name, and retrieves the value for the security question for the safe account record from the database table "user_info" and presents it to the user (FIG. 3B). The user then enters an answer to the security question, and hits the "Enter" key or clicks the "Recover" button. The server then retrieves from the submitted data the value of the answer to the security question, and compares the value with the value stored in the question field of the safe account record in the database table "user_info." If a match is found, the server sends the password to the user's email address with a message that "Password has been sent to your email address!" If the attempt is unsuccessful, the server sends a page to display an error message that "The answer to the security question is invalid."

The "Recover Password" function is implemented using the database table "user_info." One of the SQL statements for implementing the "Recover" password function would be: select password, email from user_info where safe_name='the user's safe name' and answer='the entered answer'. The system sends password to the associated email.

F. Change Right of Access Under Access Management

The user may grant the right to access to any file by associating another person's safe with the file. In addition, the user may grant right of access to any pubic member globally so the member may access the file without a safe account.

The safe owner can view all granted rights of access by using the page initiated by clicking "Access Management" on the navigation bar (FIG. 6A). The server writes a record in the table "grant_access" each time right of access is granted.

1. Grant the Right of Access Under Access Management

A safe owner can grant the right of access to his files to one or more other safes by using the page initiated by clicking "Grant New Access" on the navigation bars (FIGS. 9A, 9B). The function of this page is similar to the function of "Change Access Right" on the "File Details" page. The difference is that on this page the user can grant or revoke the right of access for several files at once.

Figure 9F:
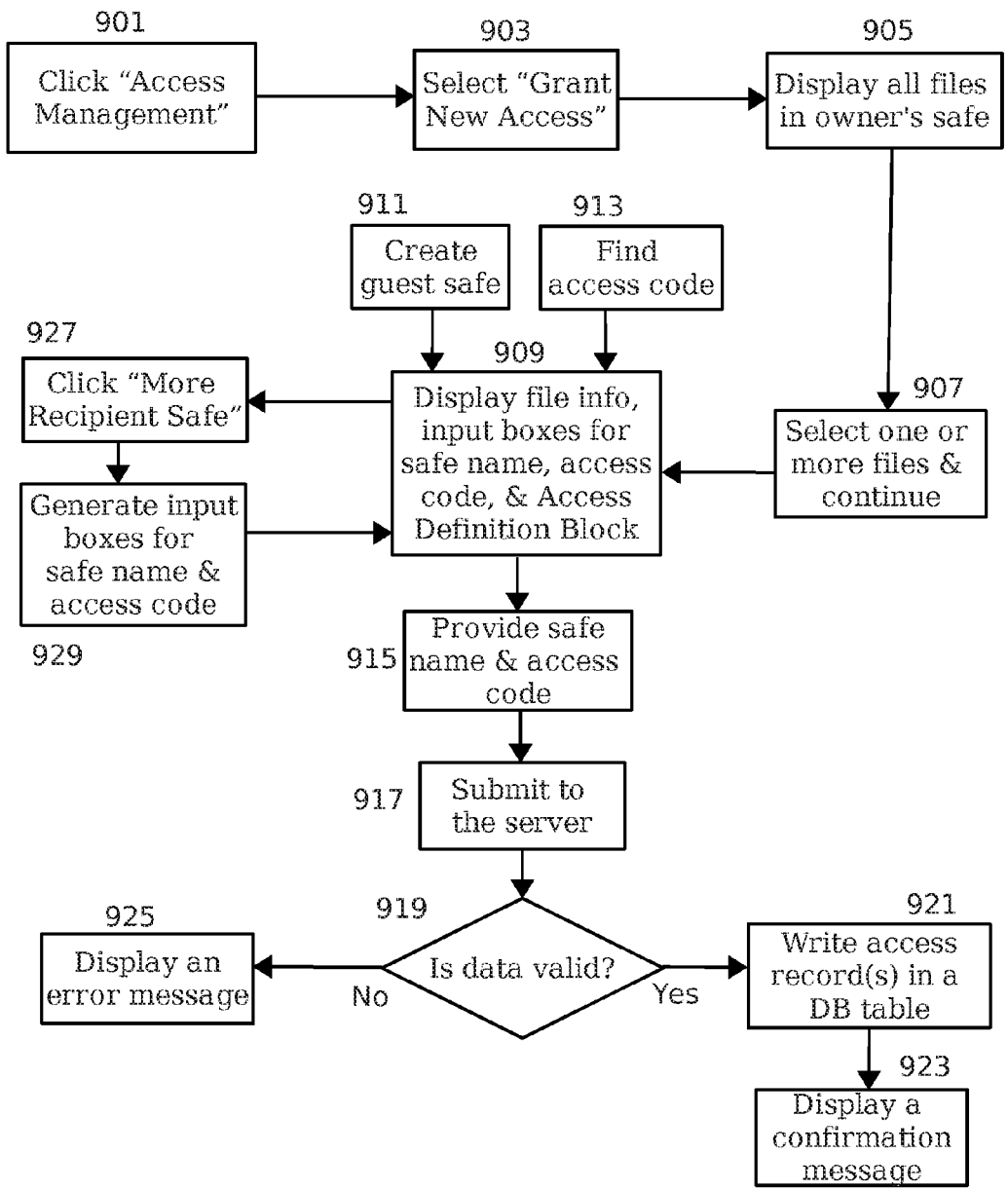
FIG. 9F shows the steps for granting right of access for plural files.

The process of granting right of access to plural parties is shown in FIG. 9F. The user first opens Access Management at Step 901. This page shown in FIG. 9A has menu "View Granted Access," "Grant New Access," and "Revoke Access." The user selects "Grant New Access" at Step 903, and selects all the files the user wants to grant right of access by checking the box next to each of the files (FIG. 9A) at Step 907. The server then sends a page showing file information for all selected files, a recipient safe name block, and an access definition block (see FIG. 9B) at Step 909. The user provides safe names and access codes for the recipient safes, and defines the right of access by clicking three sets of the selection buttons in the access definition block at Step 915. The user submits it to the server at Step 917. If the server finds that all data are valid at Step 919, it writes access records in the active grant table at Step 921 and responds with a message that the operation succeeds at Step 923 (FIG. 9C). If the operation failed, the server sends an error message at Step 925.

In Step 921, if the server finds that a prior-granted access record exists for a recipient safe, the server will update the access right. Before the old access record is deleted, the server extracts all substance from the old access record and writes the substance in the "revoked_grants" table for permanent record. The server then deletes the old access record.

Like in the case of granting access right for a single file, the user may create more recipient safe name block for entering more safe names at Steps 927, 929. The user can create one safe name block by clicking "More recipient safe" once, and remove a recipient safe name block by clicking "Fewer recipient name safe" once.

The user can also create a guest safe for a recipient user by clicking "Create " (FIG. 9B) if the recipient user does not have a safe account at Step 911. The page in FIG. 9B also allows the user to search safe account database to find access code as discussed for the process of revoking a granted right of access in FIG. 7P.

2. Revoke Right of Access Under Access Management

Figure 9G:
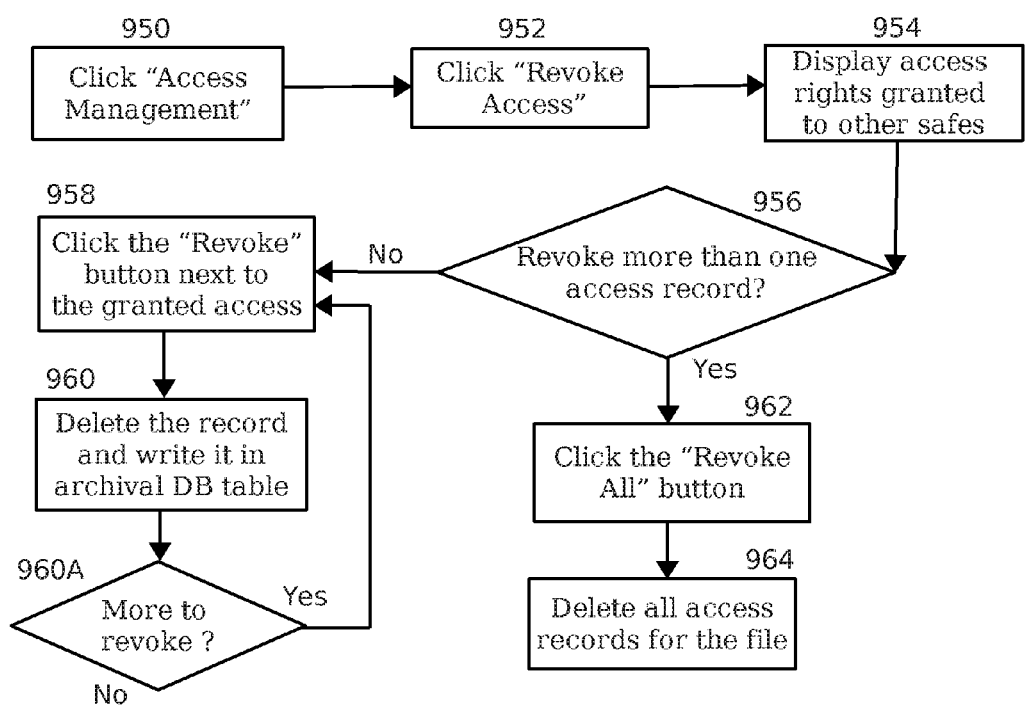
FIG. 9G shows the steps for revoking right of access for plural files.

The user can revoke right of access for plural files as shown in FIG. 9D. The interactions between different components are shown in FIG. 9G. The safe owner can perform this function by using the page initiated by clicking "Access Management" on the navigation bar (FIG. 9A). The user first opens Access Management at Step 950, and clicks "Revoke Access" at Step 952. In response, the server sends a page to display a list of granted accesses shown in FIG. 9D. If the right of access to a file has been granted to many safes, the table contains one entry for each of the grants. At the right side of each of the grant record entries on the table, a "Revoke" button is placed for use. If the user wants to revoke any of the grants, the user just clicks the button at step 958. In response, the server extracts data from the access record, deletes the access record from the grant_access table, writes the data in the revoked_grants table for archival at Step 960, and updates the web page reflecting the change. The server returns a success message (FIG. 9E). If the user wants to revoke more than one grant at Step 956, the user just clicks the individual selection buttons on the left of the entries or clicks the column header button to select all entries, and clicks the "Revoke all" button at the bottom of the web form at Step 962. In response, the server extracts the data from each of the access records, deletes each of the access records from the grant_access table, writes the extracted data in the revoked_grants table for archival, and responds with a confirmation message at Step 964.

G. Control Access by Using Guest Safes and Global Status

The right of access can be granted to a second user by creating a guest safe or designating a file as a global file. To create a guest safe account, the user types in a proposed safe name, a proposed password, and an optional proposed access code, and hits the "Enter" key or clicks the "Create" button. If a portion of safe number is used as access code, the server creates an access code for the second user. In response, the server checks the database table "user_info" to determine if the proposed safe name is already taken by another user. If the safe name is available and the proposed password is acceptable, safe information is saved into the proper fields of the database table "user_info." The server also generates a safe number. Upon successful creation of the safe, the server returns a message that "Guest safe is created successfully!" If the server is unable to create a safe account, it returns a page showing an error message that "This safe name already exists!" or "Your selected password is not acceptable!"

The newly created guest account is marked as an unidentified safe account. After the creation of the guest safe account, preferably, the system sends an email invitation to the email address of the intended second user if email address is provided so that the second user can log in the safe. Optionally, the email message contains a link to the server address so that the second user can open a page for logging in the newly created guest safe by clicking the link. If the user did not provide email address in creating the guest safe, the user must provide the safe name and the temporary password to the second user by an independent means such as email, fax, phone call, or personal meeting. The second user can then use the newly created guest safe just like a normal safe.

When the second user logs in the guest safe the first time, the system automatically sends the page prompting the second user to change the password (FIG. 4D) and requires the second user to change password to ensure the guest safe is secure. After the password is changed, the inviting user cannot access the private files in the guest safe. After the second user changes the password, the system automatically sends the login page. When the second user logs in the safe, the second user is prompted to provide its contact information such as full name, email address, and phone number. Optionally, the server sends some information on the second user such as owner name, email address, and contact phone number to the inviting user for verification. If the inviting user confirms that the second user is the intended user, the server marks the guest safe as ready.

In changing the password, the server first gets the value for the old password and compares it with the value stored in the password field. If the inputted old password is correct, the server then determines if the two new passwords are identical and acceptable. If the new password is good, the server then determines if the new password is different from the old password. If the new password is acceptable and is different from the old password, the server then writes the new password in the database table "user_info" to replace the old password, and send sa page to display a message that "Password is changed successfully!" on the browser. If there is any error, the server responds with a message that "The old password you entered is incorrect." or "Two passwords you provided are not identical" or "The new password is invalid."

In one version embodiment, the general steps for making a guest safe account are summarized as follows:

(1) The first user makes a request for creating a guest safe account.

(2) The server prompts the user to enter a proposed safe name and a proposed password (access code may be necessary in some implementations).

(3) The server creates a safe account by creating a private folder for the second user and writes required records in all related database tables.

(4) The server records the password as a provisional password and marks the safe account as an unverified or unconfirmed account.

(5) The server sends an invitation to the second user in email or by other means.

(6) The second user logs into the new safe account the first time.

(7) The server prompts the second user to change the password.

(8) The server retrieves a new password and compares it with the old proposed password. If there is a difference between the old and new passwords, the server accepts the new password. Otherwise, the server responds, prompting the second user to change the password again.

(9) The server prompts the second user to provide contact information. If no further verification is implemented, the safe is ready for use.

(10) Optionally, the server sends the name and contact information about the second user to the first user for further verification; and if the first user confirms to the server that the second user is the intended user.

(11) Upon successful optional confirmation of the guest safe owner, the server marks the safe account as a ready account.

In the alternative, a user may invite a second user to open a safe account. If the inviting user knows the email address of the second user, the user may request that the server send an email invitation to the email address of the second user. The email invitation contains a link for creating a safe account. This embedded link contains the inviting safe name in hidden fields or a special code unique of the inviting safe. In response to the invitation, the second user accesses the safe system by clicking the embedded link, and uses the page to register a new safe account. From the special data in the link, the server knows the inviting safe name and informs the inviting safe user of the newly opened safe name and its access code. Now, the inviting user can grant right of access to the files to the new safe. In this case, the newly created safe is ready for use without the need for changing password.

After the right of access to a file is granted to a second user, the lack of encryption keys may still prevent the second user from accessing the file if the file is encrypted. The owner has the duty to give encryption keys to the second user so that the second user may decrypt it when the second user downloads the file. The system may provide an option that the second user may access a file that has been decrypted, and stored on the server. If the user provides encryption keys to the second user, the secrecy of the file will be lost forever unless the right of access is revoked before the second user accesses the file.

When the second user is granted right of access to a file, the second user can read file number, owner information, uploading date and time, file size, and security method immediatly (FIG. 6B). If the file is not encrypted, the second user can download and read the file immediately. If the file is encrypted before it is uploaded, the second user may download the file that is still in an encrypted state. In this case, the duty to decrypt the file lies in the owner user and the second user.

If the file is encrypted using one-key or two-key security method, the second user logs in the server and clicks the file for download, the second user is prompted to enter the keys (preferably in duplicate) that the second user has received from the user by independent means. Now, the server retrieves the file and decrypts the file on-the-fly for the second user. The second user gets a file, which is human readable.

Encryption keys may be changed in some cases. The user may change encryption keys for a file. This can be done only if the file integrity can be maintained and only if valid grant of access right does not exist unless the user intentionally changes encrypt keys as a means to revoke outstanding grants of right of access to a file. In the alternative, the user may also constructively revoke all outstanding grants by making the file inactive. If the user changes the keys as an attempt to revoke the right to access to the file, the user is informed of the effect of this action.

In changing encryption keys, the server first uses the old keys to decrypt the file, then uses new keys to re-encrypt the file, and copies the old uploading time. In updating security method, the system may create a new file record in the file_info table with a new file number. The system may keep the old file as an inactive file for a period of time, and deletes it after the user has successfully download the newly encrypted file and decrypted the file with a success feedback. Before the server deletes the file, it can move the old file record, including the file itself, from the database table "file_info" to a correspondent archival table.

It is preferable that an email notification message is sent to the email address of the safe owner concerning the access of the file and the downloading of the file each time.

Optionally, the right of access may be granted globally for files encrypted using single or two keys. Any one having access to a computer in the Internet can access those files without logging in any safe. Any user can retrieve any file by searching its file number and download it by providing right encryption keys. If the user is unable to provide right encryption keys, the file cannot be opened, however.

H. Order Authenticity Certificates for Plural Files

By clicking the "Certificates" button on the navigation bar, the server opens the page for ordering authenticity certificates.

1. Authenticity Certificate

The default table shows all files in the safe. The user can view a certificate for any of the files by clicking the "view" button. A certificate contains a statement to certify to the authenticity of the file summary information for the file. If a certificate is issued for one or limited number of files, the information about the files is printed inside the certificate. If a certificate is intended for a large number of files, the files may be listed on separate attached pages.

The default certificate for a file contains the following information:

THIS IS TO CERTIFY THAT THE FOLLOWING FILES ARE STORED ON THE SECURE STORAGE SYSTEM:

| File No: | 1111-2222-3333-0000 |
| Uploading Date/Time: | Aug. 27, 1970 12:20:54 |
| File Size: | 245K |
| Description: | XYZ Invention Concept |
| Status: | Active |

The certificate may have an image seal of the corporation running the system. A copy of the authenticity certificate for single file is shown in FIG. 8. The user can get a copy of PDF authenticity certificate by clicking the link at the bottom of the page. In response, the server sends a download dialog to prompt the user to select an option to save or open the file. Upon user's selection, the server sends the certificate for display or writes the certificate on the local disk. A complete language may be as follows:

"THIS IS TO CERTIFY THAT THE FOLLOWING FILES ARE STORED ON THE SECURE ONLINE FILE LODGING SYSTEM AND RETRIEVABLE AT THE TIME OF ISSUING THIS CERTIFICATE AND THAT THE FOLLOWING FILE INFORMATION IS TRUE AND AUTHENTICATE AS ASCERTAINED FROM THE RECORDS ON THE SYSTEM WHICH IS OPERATED IN ACCORDANCE OF THE OPERATION AND MAINTENANCE PROCEDURE OF THE JOHN DOE CORPORATION."

Since the user can download and print the certificate, the user can freely distribute the certificate by email or mail or any suitable means. The information on the certificate may be enough to prove or disapprove a transaction or event. However, a recipient cannot definitely associate a standalone certificate with a particular file. The authenticity of the file can be established by the process of downloading and decrypting the file.

Preferably, a certificate issued is viewable by recipients directly from system. While access to decrypted files on the system real time should be sufficiently good to prove the uploading time and the substance of the file, there are circumstances that such arrangement is insufficient, impractical, or inconvenient. For example, a plaintiff in copyright infringement action cannot ask the court to view the file. The plaintiff must produce certified records.

A service should be available for sending certificate and decrypted files directly from the system management to interested recipients. This could eliminate possible tempering in transit. As an alternative, a paper certificate together with decrypted files on a suitable media may be directly sent from the custodian of records of the system management to the interested recipients.

On the page "Certificate Management", the user may view ordered e-certificates, ordered paper certificates, and e-certificates from other safes by clicking respective menus at the top (FIG. 10A). Those tables show historical certificate records, which may be used to prove the uploading times and the substances of the files. Safe user cannot change uploading times and the substances in any aspects.

On the default page of Certificate Management, there are two buttons at the end of the file table. To order a certificate for plural files for other parties, the user checks the right boxes for the files to be included, and clicks a button for Ordering Electronic Certificate or Order Hard-Copy Certificate and presses the "Continue" button. The detailed steps are described below.

2. Order E-Certificate for Other Safes

Figure 10G:
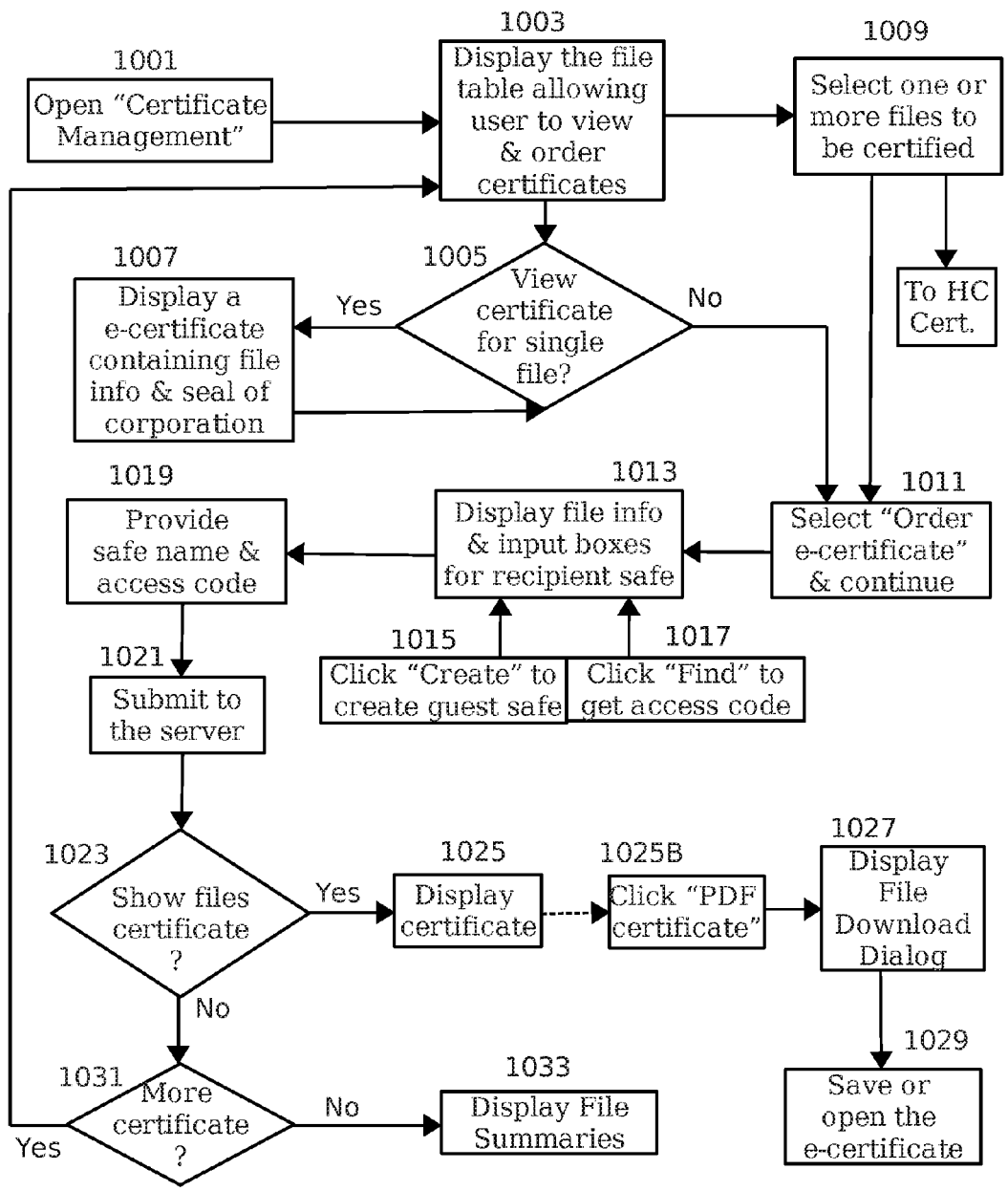
FIG. 10G shows the steps for ordering an electronic authenticity certificate for plural files.

The process of ordering an e-certificate is shown in FIG. 10G, with web views in FIGS. 10A-10C. After opening Certificate Management at Step 1001, the server opens the page "Order New Certificate" at Step 1001. The page shows only qualified files. Qualified files are active files that are not casual files. The user then selects one or more files from the qualified files at Step 1009, and clicks "Order Electronic Certificate" and presses "Continue," the server generates and sends an updated page showing all selected files and recipient safe name block at Step 1013. The user then provides Safe Name and Access Code at Step 1019 and submits the form to the server at Step 1021. The server, in response, sends a page (at Step 1023) containing (1) a summary of file information which will be printed on the certificate (2) choices for ordering another certificate or ending the ordering process, and (3) a link at top of the summary table. If the user wants to view the certificate in PDF format, the user clicks the link at Step 1025. In response, the server sends a file download dialog (at Step 1027) that contains options for saving and opening the certificate and an "OK" button. The user may view the certificate or have it saved on local disk at Step 1029. If the user chooses to end the process, the server sends File Summaries at Step 1033. If the user chooses to order another certificate at Step 1031, the server sends the page "Order New Certificate" again at Step 1003.

In processing a certificate order, the server gets the file information from the file_info table and places it in the certificates table. A good image may be used to provide background color as shown in FIG. 8. The web page is just a HTML page. There is no limit on the number of certificates a user can order. A certificate for two files may contain following information:

| | |
|---|---|
| File No: | 1111-2222-3333-0000 |
| Description: | XYX Invention |
| File Size: | 245K |
| Uploading Date/Time: | Aug. 27, 1970 12:20:54 |
| Status: | Active |
| File No: | 1111-2222-3333-1111 |
| Description: | YYY Invention |
| File Size: | 345K |
| Uploading Date/Time: | Aug. 27, 1980 12:30:54 |
| Status: | Active |

The user can also get a certificate in PDF format by using "To get a PDF version, click here" at the bottom of the web page certificate (FIG. 8). The user can save a copy of the certificate, print it, and distribute it to the interested parties. Further prompt may be provided so that the user may have the FDP certificate sent to the user's email address.

Optionally, the user may click "Create" to create a guest safe for a second user (FIG. 10B) if the intended second user does not have a safe account on the server. This process is the same that used on other pages. The user may create data entry boxes for additional recipient safes by clicking "More recipient safe" on FIG. 10B in the same way discussed in granting right of access and revoking right of access. In addition, this page also has the function of finding access code by clicking "Find."

In one sample implementation, the certificate is generated and saved in the field "certificate" in the database table "certificates." Certificate may also be saved in the safe's folder.

The certificates table in one version of the embodiment, may contain the following fields: safe_name varchar(20), file_no int unsigned, certificate_id int, recipient_safe varchar (20), recipient_safe_no varchar(20), prefix varchar(20), firstname varchar(20), lastname varchar(20), title varchar(4), address varchar(50), city varchar(20), state varchar(2), zip varchar(5), country varchar(20), phone varchar(12), email varchar(50), order_date timestamp NOT NULL default CURRENT_TIMESTAMP, certificate MEDIUMBLOB.

The authenticity certificate for other persons may be delivered to the other persons by (1) delivering it to the associated email address as an email attachment, (2) making the certificate available for downloading by the recipient, and (3) saving a copy in the recipient safe's folder. Due to the fact that a safe box is generally not used on a regular basis so that it is preferable to send the certificate to the email address of the intended recipient. If the certificate is made available for download from the safe's folder or the database table "certificates," it is preferable to send an email to notify the recipient that an e-certificate is available for download. In addition, it is desirable to display a notice to the recipient when the recipient logs in the safe next time.

3. Order Hard-Copy Certificate

Figure 10H:
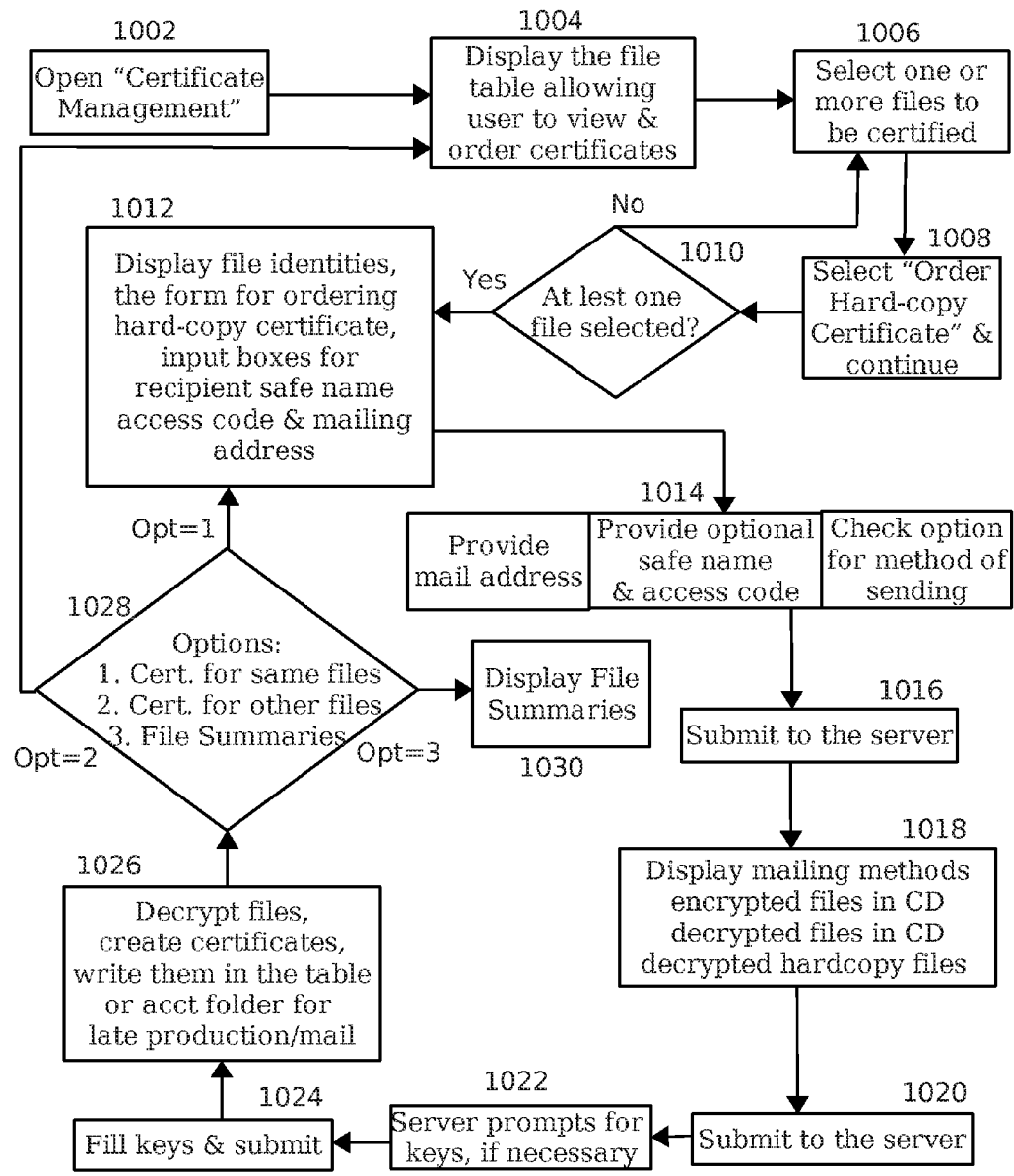
FIG. 10H shows the steps for ordering a hard-copy authenticity e-certificate for plural files.

The user may order a hard-copy certificate for any of the files for any recipients (the process in FIG. 10H, web views in FIGS. 10D-10F).

After opening Certificate Management at Step 1002, the server opens the page "Order New Certificate" at Step 1001. The page shows only qualified files. The user selects files at Step 1006, selects "Order hard-copy Certificate" and presses "Continue" at Step 1008. If no file is selected, the web page (e.g., an embedded JavaScript program) prompts the user to select files again at Step 1006. In response to a valid submission, the server opens the page for ordering hard-copy certificate at Step 1012. This page, shown in (FIG. 10D), contains file summary for selected files, a recipient safe name block, a mailing address block, and an option for including file. The user can inspect file summary of the selected files to ensure that the files are the intended files.

The recipient safe name and access code are optional delivery means. The user may grant access to the file by providing the safe name and access code of the second user or ignore them. If an intended recipient of files does not have a safe account, the user can create a guest safe for the recipient. The user then provides the detailed mailing address in the mailing address block.

The user is prompted to indicate whether the files to be certified are attached to the certificate at Step 1014. By default, the files are included unless a file is one that cannot be decrypted (e.g., encrypted pre-loaded). The user may choose not to include files.

After the user provides all information and makes all choices, the user submits the filled certificate ordering form for processing at Step 1016. In response, the server generates a form concerning the media of the files and encryption state of the files at Step 1018. The options provided for each file are (1) Encrypted Files on CD, (2) Decrypted file on CD, and (3) Decrypted files printed on papers. If a file is not encrypted, the file cannot be decrypted, regardless of user's choice. The user makes necessary selection and submits this form to the server at Step 1020. In response, the server generates a form containing input boxes for encryption keys for each of the files in the table format at Step 1022. The user provides keys and submits this form to the server at Step 1024. This page has a "Clear form" button so that the user can clear all values on the form.

Upon submission, the server processes the order, decrypts those files that are encrypted, generates a certificate, and writes them in an order table at Step 1026. It finally responds (at Step 1026) with a page containing the file summary information, a link for viewing the certificate, and three options, respectively, for (a) ordering a certificate for the same files for another party, (b) ordering another certificate for other files, and (c) going to File Summaries. If the user chooses to order a certificate for the same files, the server sends the page at Step 1012. If the user chooses to order another certificate for any files, the server sends the page at Step 1004. If the user chooses to view Files Summaries, the server sends "File Summaries" at Step 1030.

The hard-copy certificate is substantially the same as the e-certificate (shown in FIG. 8) except that the hard-copy certificate is printed on a piece of paper and delivered to the recipient by mail. The user may be optionally prompted to provide payment information in the proper boxes (Not shown in FIGS).

Preferably, the web page should have JavaScript for validating the data for each of the variable names to ensure that the address is sufficiently good for successful delivery of mail.

All the information should be saved on the server in the database table "certificates." The staff of the file lodging system prints a copy of the certificate and the file (if required), and mails them to designated recipients by mail. A hard-copy file can be printed for mailing only if the file is of a suitable type and supported by commercial applications. The staff cannot print binary files, sound file, and video files.

I. Download Files

In addition to the downloading function for each file on the "File Summaries" page, the user may download a file by clicking "Download" directly on the navigation button (FIG. 6A). This download function is essentially the same as the download function invoked in File Summaries (FIGS. 6D, 6E).

In downloading a file, the server retrieves the file from the database table or the safe's folder, and sends it to the browser. The server needs to keep track of file type from the "file_path" field. If the file is in a format that the browser can open it, it is opened on the browser unless the file is encrypted before it was uploaded. If the file is in a file format requiring special application to open, the user is prompted by the browser to save the file on the disk of the client computer.

In the "Download File" menu, one function is asking if the user needs to get an e-certificate for the file and leads to the page for ordering electronic authenticity certificate in File Details (FIG. 7A). Also, the user can open the registration page (FIG. 4A) by clicking "Sign up" to create a guest safe account for e-certificate recipient and then enter safe name and access code for the recipient.

If the user downloads a file that is encrypted by one or two encryption keys, the server retrieves the two hints from the relevant record in the "file_info" table and sends a page to display hints next to the two input boxes for accepting encryption keys. After the user types in two keys, the user starts downloading the file by clicking the "download" button. After the file is downloaded, the user may be prompted to send back a feedback about the file condition if the file has not been downloaded before. The test result may be written in an optional field "verified" in the database table "file_info." If this field has been marked as good, the server does not prompt the user to send feedback.

When a user downloads a file, the general steps for downloading the file are as follows:

1. The server generates a web page for downloading the file, the page contains file number, file type, input boxes for encryption keys; the page may also include one or two hints.
2. A user provides the encryption keys in the input boxes on the browser and submits the page to the server.
3. The server retrieves the values for the encryption keys from the submitted data.
4. The server uses the file number to find the record from the database table "file_info" and gets the value from "security" field, and constructs a decryption method.
5. The server retrieves the file from a source folder or from the "file_content" field of the file record in the database table "file_info".
6. The server then decrypts the file using the same encryption algorithm and the keys.
7. The server discards and deletes the encryption keys.
8. The server sends the download dialog for downloading the file.
9. The user chooses to open the file or have file saved, and starts the download process.
10. The browser opens the file if the user selects this method, or saves the file on the local disk if the user selects this method.
11. The user opens the file using a proper application if the file has been saved.

The server sends the download form and receives a filled form and data by using SSL layer.

J. Email Notification and Other Features

Optionally, the system has an email notification component for sending email notice upon the happening of an event according to a predetermined scheme. Events triggering the sending of email include following:

(1) When a user invites a second user to create a guest safe so that the user later can grant right of access to a file to the second user, the server sends email notice to the email address used by the second user.

(2) When a user sets up a guest safe and invites a second user to use it, the server sends email notice to the second user.

(3) After many attempts are made to access a safe, the server sends email to the owner of the safe.

(4) when a user changes encryption keys for the purpose of revoking outstanding rights of access, the server sends email notice to the parties whose rights of access are revoked.

(5) when a user marks a file as inactive for the purpose of revoking rights of access, the server sends email notice to the parties whose rights of access are revoked.

(6) When the password of a safe is given to another party though online operation due to necessity, the server sends email notice to the email address of the safe owner.

Any of those events happens, the email notification component sends an email message to relevant email addresses according to the predetermined scheme. The email notification component may use different email addresses for different events. Optionally, a safe account may have one or more email notification addresses of commercial email systems.

The implementation of email notification is well known prior art. For Linux based server, the function may be realized by using the sendmail program. The message may be prepared and saved in a file or a database field of a database table. The notification component reads a message text from the file or the suitable database table and sends the message to recipient addresses by using the sendmail program. The notification component may be called upon the happening of a user's action. In the alternative, the notification component may be implemented in one single program by using a series of conditional statements for sending email. A message text file and particular email addresses may be associated with a particular event. For the example, the general email function in a CGI C module format may be SendNotification (int event, char text_body[ ], char email_address[ ][Max]) { . . . }, where the email_address variable contains a list of email addresses, which are read from a text file or a database table or constructed in runtime. A plural email addresses are necessary because a single message may be sent to different email addresses. Additional fields may be added to hold the recipient's names and title. For example, the table may look like:

| Event | Body | Email address |
|-------|------|---------------|
| 1 | Inviting message | address A, address B, . . . |
| 2 | Thank you message | address D |

In constructing the table, a unique integer is assigned to each "event" (For example, 1 for invitation, 2 for changing file status, and 3 for updating access right). On the basis on the integer value, the server first reads the related message text from the file or the database table into the "text_body" and reads the email addresses from the file or the database table into "email_address [MAX]." Then, the server makes a call to the program for sending email, and has the email sent.

In one version of the embodiment, the general steps for sending email are as follows:

(1) An event happens as a result of a user action or server action such as expiration of time.

(2) The server reads a message text from a file or a database field consistent with the event.

(3) The server retrieves correspondent email addresses from the file or the database table consistent with the event.

(4) The server constructs the message body, and, if necessary, adds a link in the message body.

(5) The server sends the email message to the recipients using the email addresses.

Sometimes, email is not sent until a certain action takes place. For example, the server needs to check whether a grant of right has expired. The action of making this determination may be scheduled to take place at a certain time each day. Such scheduled email may be sent in a Linux machine by using Cron, which is a command scheduler that resides on the server and executes commands at intervals in seconds. It can be used to control daily, weekly or monthly jobs.

Additional features include a decrypting function (FIG. 11) and global search function (FIG. 12). Both of the functions may be called from a home page of the safe system from any client computer (FIG. 11). By using this decrypting function, a user can decrypt a file that has been encrypted by a private key and using a security method of the same system, but has been downloaded without decrypting it. This function includes selecting one-key or two-key encryption method, uploading the file, decrypting the file on the server, and downloading the decrypted file back to the client computer. The global search function allows users to search all files that are designed as global files, download and decrypt found files with private keys the users provide.

J. Different Implementations

The secured file lodging system at an elementary level may be built to host a limited number of safe accounts. To show the concept of the present invention, there is no need to use commercial database such as MYSQL. A root folder may be assigned to each of the safe accounts and files may be saved in safe account folders. File information may be maintained in a file tracking the information. However, an implementation using a database has two advantages. It can handle a large number of files efficiently and it allows users to search files efficiently.

Moreover, the database tables in this disclosure serve as examples. There are an infinite number of variations in the detailed arrangements. While the example implementation is realized using Java and JSP. Virtually any other programming languages may be used to implement the functions. For example, CGI C programs and Apache HTTP can be used to implement all of the functions. Even Shell scripts can be used to write code for implementing substantially all of those web pages. The same system may be implemented on a Windows Platform without any difficulty.

In those exemplary embodiments of the present invention, specific components, hardware parts, arrangements, and processes are used to describe the invention. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A file storing system, comprising a server having a network interface, and at least one client computer having a network interface, both the server and the at least one client computer being connected to the Internet, the system comprising:

means for creating a user account as a safe by a first user by using safe name and password;

means for generating an uploading form with one or two input boxes, each for accepting an encryption key;

means for uploading a file in the safe of the first user;

means for encrypting the file on the server by using one or two encryption keys that the first user has provided and deleting the encryption keys upon the finishing of the encryption on the server;

means for saving the uploaded and encrypted file along with tracking information on the server;

means for showing the file among other files in the safe of the first user;

means for showing any of the files and deleting any of the files in the safe of the first user;

means for generating a file-downloading page containing one or two input boxes for accepting an encryption key for a selected file, decrypting the selected file on the server by using the keys that the first user has provided, and downloading the selected file to the client computer of the first user;

means for granting right of access to at least one file in the safe of the first user to a safe of a second user; and means for allowing the second user to access the at least one file of the first user, select a file from the at least one file of the first user, and send proper encryption keys to the server, descrypting the selected file on the server, and downloading the selected file to the client computer of the second user.

2. The system of claim 1 wherein the uploading form contains an input box for accepting a hint for each of the one or two encryption keys and the file-downloading page displays the hint that has been entered for each of the one or two encryption keys and has been saved on the server.

3. The system of claim 1 further comprising means for allowing the first user to get an authenticity certificate for each of the files in the safe of the first user, the authenticity certificate containing file uploading time, file size, and file description.

4. The system of claim 1 further comprising means for authorizing the safe of the second user to retrieve from the server an authenticity certificate for the at least one file or the means for sending an authenticity certificate to the second user by email.

5. The system of claim 1 further comprising means for making a file in the first safe to be globally accessible so that any user of the system can access it and any user having proper encryption key can decrypt and download the file.

6. The system of claim 1 further comprising means for maintaining access histories for each of the files in each of the safes on the server.

7. The system of claim 1 further comprising means for tracking the access history of each encrypted file on the server and determining if the right of access to each of the encrypted files has expired or revoked.

8. The system of claim 1 further comprising means for downloading a program for decrypting standalone files that have been encrypted using the same algorithm and the encryption keys in uploading the files to the server.

9. The system of claim 1 further comprising means for ordering a hard copy of at least one file together with an authenticity certificate certifying the file description, uploading time, and file size.

10. A method of storing confidential files on a server and client system for future proof of the substance and creation time of the files, the method comprising the steps of:
   creating a user account as a safe by a first user using a safe name and safe password;
   generating an uploading form by the server containing one or two input boxes for accepting an encryption key;
   uploading a file from the client computer of the first user;
   encrypting the file by using the one or two encryption keys that the first user has provided and deleting the one or two encryption keys upon the finishing of encryption;
   saving the uploaded and encrypted file along with tracking information on the server;
   sending a verification page for the encrypted file, prompting the first user to enter one or two encryption keys corresponding to the one or two encryption keys used in encrypting the file in uploading, sending the encryption keys to the server and decrypting the uploaded file on the server by using the received encryption keys and deleting the encryption keys upon the finishing of the decryption, downloading the decrypted file to the client computer of the first user for inspection, and marking the uploaded file as a verified file upon successful verification;
   sending a file summary page to the client computer of the first user to display file information about the files in the safe of the first user, the file summary page containing file descriptions, uploading times and file sizes;
   displaying any of the files, and deleting any of the files in the safe of the first user; and
   generating a file-downloading page containing one or two input boxes for accepting an encryption key for a selected file, sending to the server proper encryption keys correspondent to the encryption keys used in encrypting the selected file during uploading, decrypting the selected file on the server by using the received encryption keys, deleting the encryption keys upon the finishing of decryption, and downloading the selected file to the client computer of the first user.

11. The method of claim 10 further comprising the steps of granting right of access to at least one file of the safes of the first user to a safe of a second user, enabling the second user to access the file of the first user, decrypt the file on the server, and download the file to the client computer of the second user.

12. The method of claim 10 further comprising a step of allowing the first user to get an authenticity certificate for any of the encrypted files in the safe of the first user, wherein the authenticity certificate contains file uploading time, file size, and file description.

13. The method of claim 11 further comprising a step of authorizing the safe of the second user to retrieve an authenticity certificate for the files or a step of sending the authenticity to the second user by email.

14. The method of claim 10 further comprising a step of making a file in the safe of the first user to be globally accessible so that any user of the system can access the file and any user having proper encryption keys can decrypt and download the file.

15. The method of claim 10 further comprising a step of maintaining access histories for each of the encrypted files for each of the safes on the server.

16. The method of claim 10 further comprising a step of tracking the usage of rights of access granted to a file and determining if the right of access to the file has expired or revoked.

17. The method of claim 10 wherein the uploading form contains an input box for accepting a hint for each of the one or two encryption keys and the file-downloading page displays each hint that has been entered for each of the encryption keys and has been saved on the server.

18. The method of claim 10 further comprising a step of ordering by the second user a hard copy of files granted to the second user, together with an authenticity certificate certifying to the file descriptions, uploading times, and file sizes.

19. A computer program product for use in operating file storage system comprising a server and at least one client computer, the computer program product comprising a computer usable medium having computer readable code embodied on the medium, the computer program code further comprising:
   program code for creating a user account as a safe by using a safe name or account number and safe password;
   program code for generating an uploading form with one or two input boxes for accepting an encryption key;
   program code for uploading files to the server;
   program code for encrypting files on the server by using one or two encryption keys that the first user has provided and deleting the encryption keys upon the finishing of encryption;
   program code for saving the uploaded file with tracking information on the server;
   program code for sending a verification page for an encrypted file, prompting the first user to enter one or two encryption keys correspondent to the keys used in uploading the file, sending the user-entered encryption keys to the server, decrypting the uploaded file on the server by using the received encryption keys, downloading the decrypted file to the client computer of the first user for inspection, prompting the first user to indicate if the uploaded file is good, and marking the uploaded file as a verified file upon successful verification;
   program code for sending a page for displaying the files, and deleting the files in any safe on the server;
   program code for generating a file-downloading page containing one or two input boxes for accepting an encryption key for a selected file, decrypting the selected file on the server using the encryption keys the first user has provided, and downloading the selected file to the client computer of the first user;

program code for granting right of access to at least one file of the first user to a safe of a second user; and program code for enabling the second user to access the at least one file of the first user and select a file for downloading, sending to the server one or two encryption keys correspondent to the encryption keys used in encrypting the file in uploading, decrypting the file on the server using the received encryption keys, and downloading the uploaded file to the client computer of the second user.

20. A computer program product of claim 19 further comprising program code for decrypting standalone files that have been encrypted using the same algorithm and the encryption keys in uploading the files to the server.

* * * * *